US012658432B2

(12) United States Patent
Huan et al.

(10) Patent No.: US 12,658,432 B2
(45) Date of Patent: Jun. 16, 2026

(54) COMPOSITE POSITIVE ELECTRODE MATERIAL AND PREPARATION METHOD THEREOF, POSITIVE ELECTRODE PLATE, SECONDARY BATTERY, AND ELECTRIC APPARATUS

(71) Applicant: CONTEMPORARY AMPEREX TECHNOLOGY (HONG KONG) LIMITED, Hong Kong (CN)

(72) Inventors: Shuxing Huan, Ningde (CN); Chongheng Shen, Ningde (CN); Bangrun Wang, Ningde (CN); Changxu Wu, Ningde (CN); Na Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 54 days.

(21) Appl. No.: 18/970,584

(22) Filed: Dec. 5, 2024

(65) Prior Publication Data

US 2025/0096255 A1 Mar. 20, 2025

Related U.S. Application Data

(63) Continuation of application No. PCT/CN2023/070182, filed on Jan. 3, 2023.

(51) Int. Cl.
H01M 4/505 (2010.01)
H01M 4/02 (2006.01)
(Continued)

(52) U.S. Cl.
CPC .......... H01M 4/505 (2013.01); H01M 4/131 (2013.01); H01M 4/1391 (2013.01);
(Continued)

(58) Field of Classification Search
CPC .... H01M 4/505; H01M 4/131; H01M 4/1391; H01M 4/364; H01M 2004/021;
(Continued)

(56) References Cited

U.S. PATENT DOCUMENTS 9,601,772 B2 * 3/2017 Sasaoka ................ H01M 4/485
10,508,335 B1 * 12/2019 Yilmaz ................ C23C 16/045
(Continued)

FOREIGN PATENT DOCUMENTS

CN 103189316 A * 7/2013 ............ H01M 4/525
CN 105280909 A 1/2016
(Continued)

OTHER PUBLICATIONS

State Intellectual Property Office of China Notification of Grant of Invention Patent Right for Application No. 202380048964.0 Nov. 3, 2025 7 pages (including translation).
(Continued)

*Primary Examiner* — Kaity V Chandler
(74) *Attorney, Agent, or Firm* — ANOVA LAW GROUP, PLLC

(57) ABSTRACT

A composite positive electrode material is $Li[Li_xNi_aCo_bMn_cM_d]O_2$, where $x+a+b+c+d=1$, $0<a$, b, and $c<1$, $0\leq d\leq 0.05$, $0\leq x$, and the element M includes one or more of Al, B, Zr, Sr, Y, Sb, Ta, Na, K, W, Ti, Mg, Nb, Hf, Mo, and Ce. A span of the composite positive electrode material is 1.2-2.0. The composite positive electrode material includes first and second lithium-rich manganese-based positive electrode materials. The first lithium-rich manganese-based positive electrode material includes rod-like primary particles with a length of 0.1-1.5 μm and secondary particles with $D_v50$ of 3-8 μm. The second lithium-rich manganese-based positive electrode material includes spheroidal pri-
(Continued)

1000 mary particles with a diameter of 0.1-400 nm and secondary particles with $D_v50$ of 8-20 μm.

17 Claims, 6 Drawing Sheets

(51) Int. Cl.

| | | |
|---|---|---|
| *H01M 4/131* | (2010.01) | |
| *H01M 4/1391* | (2010.01) | |
| *H01M 4/36* | (2006.01) | |

(52) U.S. Cl.
CPC ...... *H01M 4/364* (2013.01); *H01M 2004/021* (2013.01); *H01M 2004/028* (2013.01)

(58) Field of Classification Search
CPC ........... H01M 2004/028; H01M 4/525; H01M 10/0525; H01M 4/36; C01P 2002/52; C01P 2004/03; C01P 2004/16; C01P 2004/32; C01P 2004/50; C01P 2004/51; C01P 2004/61; C01P 2004/62; C01P 2004/64; C01P 2006/12; C01P 2006/40; C01G 53/50; C01G 53/502; C01G 53/82; C01G 53/84; Y02E 60/10
See application file for complete search history.

(56) References Cited

U.S. PATENT DOCUMENTS

| | | | | |
|---|---|---|---|---|
| 10,964,940 | B1 * | 3/2021 | Mason ................ | H01M 4/1393 |
| 11,362,318 | B2 * | 6/2022 | Azami ................ | H01M 4/505 |
| 2015/0155548 | A1 * | 6/2015 | Ryoshi ................ | C01G 53/42 |
| | | | | 429/223 |

| | | | | |
|---|---|---|---|---|
| 2016/0013472 | A1 * | 1/2016 | Mitsumoto ............ | C01G 53/50 |
| | | | | 429/231.1 |
| 2017/0317349 | A1 * | 11/2017 | Ju ........................... | C01G 53/50 |
| 2020/0083524 | A1 * | 3/2020 | Baek ................... | H01M 4/1315 |
| 2020/0259172 | A1 * | 8/2020 | Jo ...................... | H01M 10/0525 |
| 2021/0104741 | A1 * | 4/2021 | Han ....................... | H01M 4/523 |
| 2021/0151752 | A1 * | 5/2021 | Park .................... | H01M 10/052 |
| 2021/0276875 | A1 * | 9/2021 | Mason .................. | H01M 4/583 |
| 2021/0408530 | A1 * | 12/2021 | Mason .................. | H01M 4/625 |
| 2023/0076419 | A1 * | 3/2023 | Zhu ....................... | H01M 4/505 |
| 2024/0030402 | A1 * | 1/2024 | Lee ....................... | H01M 4/136 |
| 2024/0030414 | A1 * | 1/2024 | Chae ..................... | H01M 4/505 |
| 2025/0140794 | A1 * | 5/2025 | Kim ..................... | H01M 4/364 |
| 2025/0167241 | A1 * | 5/2025 | Shim ................. | H01M 10/0525 |

FOREIGN PATENT DOCUMENTS

| | | | | | |
|---|---|---|---|---|---|
| CN | 107221656 | A | | 9/2017 | |
| CN | 108199025 | A | | 6/2018 | |
| CN | 108557905 | A | | 9/2018 | |
| CN | 105633345 | B | * | 1/2020 | ........... H01M 4/134 |
| CN | 111384372 | A | | 7/2020 | |
| CN | 107221656 | B | * | 12/2020 | ........... H01M 4/364 |
| CN | 114256443 | A | | 3/2022 | |
| CN | 114944468 | A | | 8/2022 | |
| CN | 115241449 | A | * | 10/2022 | ........... H01M 4/485 |
| GB | 2551369 | A | * | 12/2017 | ........... H01M 4/364 |
| KR | 20200145747 | A | * | 12/2020 | ........... C01G 53/82 |

OTHER PUBLICATIONS

The World Intellectual Property Organization (WIPO) International Search Report and Written Opinion for PCT/CN2023/070182 Jul. 18, 2023 10 Pages (including translation).

* cited by examiner

COMPOSITE POSITIVE ELECTRODE MATERIAL AND PREPARATION METHOD THEREOF, POSITIVE ELECTRODE PLATE, SECONDARY BATTERY, AND ELECTRIC APPARATUS

CROSS-REFERENCE TO RELATED APPLICATION

This application is a continuation of International Application No. PCT/CN2023/070182, filed on Jan. 3, 2023, the entire content of which is incorporated herein by reference.

TECHNICAL FIELD

This application relates to the field of batteries, and specifically, to a composite positive electrode material and a preparation method thereof, a positive electrode plate, a secondary battery, and an electric apparatus.

BACKGROUND

Lithium-ion batteries are environmentally friendly pollution-free secondary batteries, and meet current major development requirements of all countries in energy and environmental protection. In recent years, lithium-rich manganese-based positive electrode materials are considered to be the most promising positive electrode materials for next-generation lithium-ion traction batteries because of their advantages such as high specific capacity, high discharge plateau, low costs, and environmental friendliness, and have attracted extensive attention. However, lithium-rich manganese-based positive electrode materials still have low compacted density, and secondary batteries still have poor cycling performance.

SUMMARY

In view of the foregoing problems, this application provides a composite positive electrode material and a preparation method thereof, a positive electrode plate, a secondary battery, and an electric apparatus, to resolve problems of low compacted density of a lithium-rich manganese-based positive electrode material and poor cycling performance of a secondary battery.

According to a first aspect, this application provides a composite positive electrode material. A chemical formula of the composite positive electrode material is $Li[Li_xNi_a\text{-}Co_bMn_cM_d]O_2$, where $x+a+b+c+d=1$, $0<a$, b, and $c<1$, $0\leq d\leq 0.05$, $0\leq x$, and the element M includes one or more of Al, B, Zr, Sr, Y, Sb, Ta, Na, K, W, Ti, Mg, Nb, Hf, Mo, and Ce. A span of the composite positive electrode material is 1.2-2.0, where the span=$(D_v90-D_v10)/D_v50$, and $D_v90$, $D_v10$, and $D_v50$ are a particle volume distribution $D_v90$, a particle volume distribution $D_v10$, and a volume median diameter $D_v50$ of the composite positive electrode material. The composite positive electrode material includes a first lithium-rich manganese-based positive electrode material and a second lithium-rich manganese-based positive electrode material. Primary particles of the first lithium-rich manganese-based positive electrode material are rod-like particles, a length of the rod-like particle is 0.1-1.5 μm, and a volume median diameter $D_v50$ of secondary particles of the first lithium-rich manganese-based positive electrode material is 3-8 μm. Primary particles of the second lithium-rich manganese-based positive electrode material are spheroidal particles, a diameter of the spheroidal particle is 0.1-400 nm, and a volume median diameter $D_v50$ of secondary particles of the second lithium-rich manganese-based positive electrode material is 8-20 μm.

In the technical solutions of embodiments of this application, the volume median diameter $D_v50$ of the secondary particles of the first lithium-rich manganese-based positive electrode material is 3-8 μm, and the volume median diameter $D_v50$ of the secondary particles of the second lithium-rich manganese-based positive electrode material is 8-20 μm, so that large and small particles are mixed. In addition, the span is designed. If the span is less than 1.2, it indicates that overall particle sizes of the positive electrode material are uniform, a gap between materials is large, and the compacted density is low. If the span is greater than 2.0, distributions of large and small particle sizes between materials vary greatly, producing micropowder or a material with an ultra-large particle size and leading to poor kinetic performance. Therefore, the span of 1.2-2.0 facilitates gap filling with large and small particles and helps increase the compacted density. Further, the shapes and sizes of the primary particles of the first lithium-rich manganese-based positive electrode material and the second lithium-rich manganese-based positive electrode material are limited. The primary particles of the first lithium-rich manganese-based positive electrode material are rod-like particles, the length of the rod-like particle is 0.1-1.5 μm, and a specific surface area is small. This helps prolong the cycle life. The primary particles of the second lithium-rich manganese-based positive electrode material are spheroidal particles, the diameter of the spheroidal particle is 0.1-400 nm, and a specific surface area is large. This achieves good kinetic performance and helps improve capacity utilization. The two materials are mixed to form the composite positive electrode material, so that the cycling performance of a secondary battery is improved. In this way, the volume median diameter $D_v50$ of the secondary particles of the first lithium-rich manganese-based positive electrode material and the volume median diameter $D_v50$ of the secondary particles of the second lithium-rich manganese-based positive electrode material are controlled, the span of the composite positive electrode material is controlled, and the shapes and sizes of the primary particles of the first lithium-rich manganese-based positive electrode material and the second lithium-rich manganese-based positive electrode material are controlled, so that the composite positive electrode material has high compacted density and the secondary battery has good cycling performance.

In some embodiments, the volume median diameter $D_v50$ of the composite positive electrode material is 6-15 μm, and BET of the composite positive electrode material is 1.5-8.5 $m^2/g$.

In the technical solutions of the embodiments of this application, the volume median diameter $D_v50$ of the composite positive electrode material is controlled within a range of 6-15 μm. This facilitates gap filling with large and small particles and helps increase the compacted density. BET of the composite positive electrode material is controlled within an appropriate range, so that a velocity of a side reaction between the composite positive electrode material and an electrolyte and the kinetic performance are at a proper level, and the secondary battery has good cycling performance.

In some embodiments, the volume median diameter $D_v50$ of the composite positive electrode material is 7-10 μm, and BET of the composite positive electrode material is 2-7 $m^2/g$.

In a battery cell in the embodiments of this application, ranges of the volume median diameter $D_v50$ and BET of the composite positive electrode material are further limited. This further optimizes the cycling performance of the secondary battery while increasing the compacted density of the composite positive electrode material.

In some embodiments, the span of the composite positive electrode material is 1.4-1.8. A range of the span of the composite positive electrode material is further limited, so that the compacted density of the composite positive electrode material is further optimized.

In some embodiments, the length of the rod-like particle is 0.3-1.3 μm, and the diameter of the spheroidal particle is 50-350 nm. A range of the length of the rod-like particle of the first lithium-rich manganese-based positive electrode material and a range of the diameter of the spheroidal particle of the second lithium-rich manganese-based positive electrode material are further limited to improve the cycling performance of the secondary battery.

In some embodiments, a mass ratio of the first lithium-rich manganese-based positive electrode material to the second lithium-rich manganese-based positive electrode material is 5:5-1:9. The mass ratio of the first lithium-rich manganese-based positive electrode material to the second lithium-rich manganese-based positive electrode material is limited, so that filling with large and small particles is appropriate. This helps increase the compacted density and optimizes the cycling performance of the secondary battery.

In some embodiments, a span of the secondary particle of the first lithium-rich manganese-based positive electrode material is 0.4≤span≤2.2, and a span of the secondary particle of the second lithium-rich manganese-based positive electrode material is 0.4≤span≤2.2. If the span is less than 0.4, it indicates that overall particle sizes are uniform, a gap between materials is large, and the compacted density is low. If the span is greater than 2.2, distributions of large and small particle sizes vary greatly, producing micropowder or a material with an ultra-large particle size and leading to poor kinetic performance. Therefore, the span is 0.4-2.2, and small particles are distributed between large particles, so that a gap filling capability is stronger. This increases the compacted density and helps achieve good kinetic performance.

In some embodiments, the span of the secondary particle of the first lithium-rich manganese-based positive electrode material is 0.4≤span≤1.5, and the span of the secondary particle of the second lithium-rich manganese-based positive electrode material is 0.5≤span≤1.5. The span of the secondary particle of the first lithium-rich manganese-based positive electrode material and the span of the secondary particle of the second lithium-rich manganese-based positive electrode material are further optimized to increase the compacted density.

In some embodiments, BET of the first lithium-rich manganese-based positive electrode material is 0.4-2.5 m²/g, and BET of the second lithium-rich manganese-based positive electrode material is 2.5-10 m²/g. The specific surface area of the first lithium-rich manganese-based positive electrode material is small, thereby helping prolong the cycle life. The specific surface area of the second lithium-rich manganese-based positive electrode material is large. A velocity of a side reaction between the second lithium-rich manganese-based positive electrode material and an electrolyte and the kinetic performance of a positive electrode of the battery are good. This helps improve capacity utilization. Therefore, the two materials are mixed to form the composite positive electrode material, so that the cycling performance of the secondary battery is improved.

In some embodiments, BET of the first lithium-rich manganese-based positive electrode material is 1.0-2.0 m²/g, and BET of the second lithium-rich manganese-based positive electrode material is 3.0-7.0 m²/g. In this way, the specific surface areas can be further optimized to further improve the cycling performance of the secondary battery.

According to a second aspect, this application provides a preparation method for a positive electrode material, including: providing a first lithium-rich manganese-based positive electrode material, where a chemical formula of the first lithium-rich manganese-based positive electrode material is $Li[Li_{x1}Ni_{a1}Co_{b1}Mn_{c1}M_{d1}]O_2$, $x1'+a1'+b1'+c1'+d1'=1$, $0<a1'$, $b1'$, and $c1'<1$, $0≤d1'≤0.05$, $0≤x1'$, primary particles of the first lithium-rich manganese-based positive electrode material are rod-like particles, a length of the rod-like particle is 0.1-1.5 μm, and a volume median diameter $D_v50$ of secondary particles of the first lithium-rich manganese-based positive electrode material is 3-8 μm; providing a second lithium-rich manganese-based positive electrode material, where a chemical formula of the second lithium-rich manganese-based positive electrode material is $Li[Li_{x2}Ni_{a2}Co_{b2}Mn_{c2}M_{d2}]O_2$, $x2'+a2'+b2'+c2'+d2'=1$, $0<a2'$, $b2'$, and $c2'<1$, $0≤d2'≤0.05$, $0≤x2'$, primary particles of the second lithium-rich manganese-based positive electrode material are spheroidal particles, a diameter of the spheroidal particle is 0.1-400 nm, and a volume median diameter $D_v50$ of secondary particles of the second lithium-rich manganese-based positive electrode material is 8-20 μm; and mixing the first lithium-rich manganese-based positive electrode material and the second lithium-rich manganese-based positive electrode material to obtain the composite positive electrode material according to any one of the foregoing embodiments, where a mass ratio for mixing the first lithium-rich manganese-based positive electrode material and the second lithium-rich manganese-based positive electrode material is 5:5-1:9, and the element M includes one or more of Al, B, Zr, Sr, Y, Sb, Ta, Na, K, W, Ti, Mg, Nb, Hf, Mo, and Ce.

In the technical solutions of embodiments of this application, the volume median diameter $D_v50$ of the secondary particles of the first lithium-rich manganese-based positive electrode material is controlled to be 3-8 μm, and the volume median diameter $D_v50$ of the secondary particles of the second lithium-rich manganese-based positive electrode material is controlled to be 8-20 μm, so that large and small particles are mixed. The mass ratio of the first lithium-rich manganese-based positive electrode material to the second lithium-rich manganese-based positive electrode material is controlled, so that the span of the composite positive electrode material can be optimized, to optimize the compacted density and cycling performance of a secondary battery. Shapes and sizes of the primary particles of the first lithium-rich manganese-based positive electrode material and the second lithium-rich manganese-based positive electrode material are limited. The primary particles of the first lithium-rich manganese-based positive electrode material are rod-like particles, the length of the rod-like particle is 0.1-1.5 μm, and a specific surface area is small. This helps prolong the cycle life. The primary particles of the second lithium-rich manganese-based positive electrode material are spheroidal particles, the diameter of the spheroidal particle is 0.1-400 nm, and a specific surface area is large. A velocity of a side reaction between the second lithium-rich manganese-based positive electrode material and an electrolyte and the kinetic performance of a positive electrode of the battery are good. This helps improve capacity utilization, so that the cycling performance of the secondary battery is improved.

In some embodiments, the step of providing a first lithium-rich manganese-based positive electrode material includes: evenly mixing a first lithium source and a first precursor at a molar ratio of 1.1-1.9, adding a first additive, and performing sintering to obtain the first lithium-rich manganese-based positive electrode material, where the first lithium source includes one or more of lithium carbonate, lithium hydroxide, lithium phosphate, lithium nitrate, and lithium acetate, a chemical formula of the first precursor is $Ni_{a1}Co_{b1}Mn_{c1}(OH)_2$, $0<a1$, $b1$, and $c1<1$, an amount of the first additive calculated based on total mass of the first lithium source and the first precursor is 0-20,000 ppm, and the first additive is a compound including the element M.

A material type of the first precursor and a preparation process are limited, so that the first lithium-rich manganese-based positive electrode material in which the primary particles are rod-like particles with the length of 0.1-1.5 μm and the volume median diameter $D_v50$ of the secondary particles is 3-8 μm is prepared.

In some embodiments, the step of providing a second lithium-rich manganese-based positive electrode material includes: evenly mixing a second lithium source and a second precursor at a molar ratio of 1.1-1.9, adding a second additive, and performing sintering to obtain the second lithium-rich manganese-based positive electrode material, where the second lithium source includes one or more of lithium carbonate, lithium hydroxide, lithium phosphate, lithium nitrate, and lithium acetate, a chemical formula of the second precursor is $Ni_{a2}Co_{b2}Mn_{c2}(CO)_3$, $0<a2$, $b2$, and $c2<1$, an amount of the second additive calculated based on total mass of the second lithium source and the second precursor is 0-20,000 ppm, and the second additive is a compound including the element M.

A material type of the second precursor and a preparation process are limited, so that the second lithium-rich manganese-based positive electrode material in which the primary particles are spheroidal particles with the diameter of 0.1-400 nm and the volume median diameter $D_v50$ of the secondary particles is 8-20 μm is prepared.

According to a third aspect, this application provides a positive electrode plate. The positive electrode plate includes a positive electrode film layer and a substrate. The positive electrode film layer includes the composite positive electrode material according to the first aspect, or a composite positive electrode material prepared by using the preparation method for a composite positive electrode material according to the second aspect.

In some embodiments, the positive electrode film layer further includes a conductive agent and a binder, and the positive electrode film layer includes 95%-99.5% of the composite positive electrode material based on a total weight of the positive electrode film layer. The percentage of the composite positive electrode material in the positive electrode film layer is adjusted and controlled to improve performance of the positive electrode plate.

According to a fourth aspect, this application provides a secondary battery including the positive electrode plate according to the third aspect.

According to a fifth aspect, this application provides an electric apparatus including the secondary battery according to the fourth aspect.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of embodiments below. The accompanying drawings are merely intended to illustrate some embodiments and are not intended to limit this application. Moreover, same reference signs are used to represent same components throughout the accompanying drawings. In the accompanying drawings.

Figure 1:
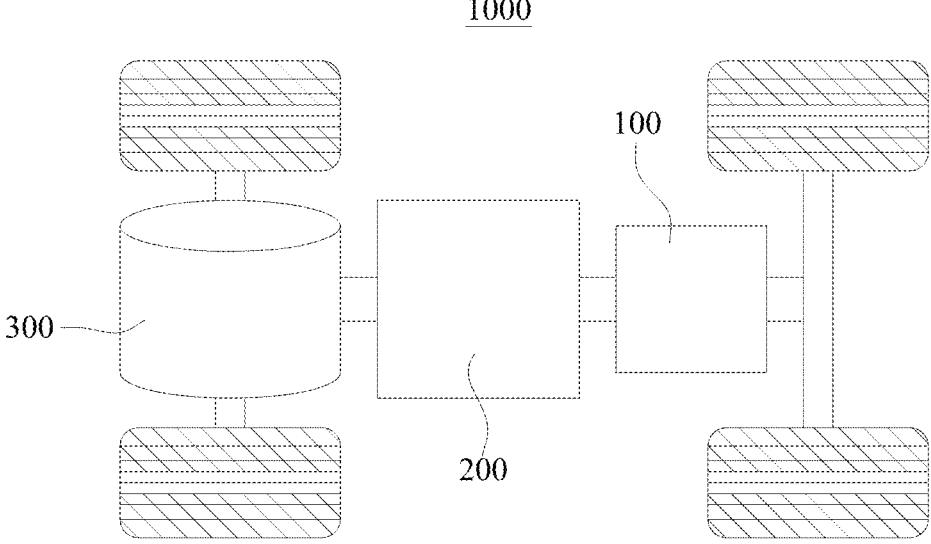
FIG. 1 is a schematic structural diagram of an electric apparatus according to some embodiments of this application.

Reference signs in specific embodiments are described as follows:

1000: electric apparatus;

100: battery; 200: controller; 300: motor;

10: box; 11: first portion; 12: second portion;

20: battery cell; 21: end cover; 21*a*: electrode terminal; 22: housing; 23: cell assembly; and 23*a*: tab.

DESCRIPTION OF EMBODIMENTS

Embodiments of technical solutions of this application are described in detail below with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used in this specification shall have the same meanings as commonly understood by persons skilled in the art to which this application belongs. The terms used in this specification are merely intended to describe the specific embodiments rather than to limit this application. The terms "include", "comprise", "have", and any other variations thereof in this specification, claims, and the brief description of the accompanying drawings of this application are intended to cover non-exclusive inclusions.

In the description of the embodiments of this application, the technical terms "first", "second", and the like are merely intended to distinguish between different objects, and shall not be understood as any indication or implication of relative importance or any implicit indication of the number, sequence or primary-secondary relationship of the technical features indicated. In the description of the embodiments of this application, "a plurality of" means two or more, unless otherwise explicitly and specifically defined.

In this specification, reference to "embodiment" means that specific features, structures or characteristics described with reference to the embodiment may be incorporated in at least one embodiment of this application. The term appearing in various places in this specification does not necessarily refer to the same embodiment or an independent or alternative embodiment that is exclusive of other embodiments. Persons skilled in the art explicitly and implicitly understand that the embodiments described in this specification may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification usually indicates an "or" relationship between the associated objects. In this disclosure, the phrases "at least one of A, B, and C" and "at least one of A, B, or C" both mean only A, only B, only C, or any combination of A, B, and C.

In the description of the embodiments of this application, the term "a plurality of" means two (inclusive) or more. Similarly, "a plurality of groups" means two (inclusive) or more groups, and "a plurality of pieces" means two (inclusive) or more pieces.

In the description of the embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the means or components mentioned must have specific orientations or must be constructed or manipulated according to specific orientations, and therefore shall not be construed as any limitation on the embodiments of this application.

In the description of the embodiments of this application, unless otherwise specified and defined explicitly, the technical terms "mounting", "connection", "join", "fastening", and the like should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skills in the art can understand specific meanings of these terms in this application as appropriate to specific situations.

Currently, from the perspective of market development, application of traction batteries is being more extensive. Traction batteries have been not only used in energy storage power systems such as hydroelectric power plants, thermal power plants, wind power plants, and solar power plants, but also widely used in many other fields including electric transportation tools such as electric bicycles, electric motorcycles, and electric vehicles, military equipment, and aerospace. With the continuous expansion of application fields of traction batteries, market demands for traction batteries are also increasing.

The inventors have noted that the new energy industry has developed rapidly in recent years, and an increasing range of new energy vehicles imposes an increasingly high requirement on energy density of a traction battery. Actual energy density of commercial lithium-ion batteries increases slowly due to a limitation of an embedded energy storage mechanism of their own materials, and gradually approaches a limit value of 300 Wh/kg. Therefore, to meet consumption requirements of the electric vehicle market, development of secondary batteries with higher energy density has become a social consensus. In recent years, lithium-rich manganese-based positive electrode materials have attracted much attention because of their high energy density and high discharge plateau. However, currently reported lithium-rich manganese-based positive electrode materials still have problems of low compacted density and poor cycling performance.

To alleviate the problems of low compacted density and poor cycling performance of lithium-rich manganese-based positive electrode materials, the applicant has found through research that constituents of a positive electrode material and a ratio between constituents can be studied.

The present disclosure provides a lithium-rich manganese-based positive electrode material with high compacted density and a preparation method thereof. A positive electrode material prepared by using the method can provide higher compacted density and also improve the cycling performance.

Based on the foregoing considerations, to resolve the problems of low compacted density and poor cycling performance of lithium-rich manganese-based positive electrode materials, the inventors have designed a composite positive electrode material through in-depth research. A chemical formula of the composite positive electrode material is $Li[Li_xNi_aCo_bMn_cM_d]O_2$, where $x+a+b+c+d=1$, $0<a$, $b$, and $c<1$, $0\leq d\leq0.05$, $0\leq x$, and the element M includes one or more of Al, B, Zr, Sr, Y, Sb, Ta, Na, K, W, Ti, Mg, Nb, Hf, Mo, and Ce. A span of the composite positive electrode material is 1.2-2.0, where the span=$(D_v90-D_v10)/D_v50$, and $D_v90$, $D_v10$, and $D_v50$ are a particle volume distribution $D_v90$, a particle volume distribution $D_v10$, and a volume median diameter $D_v50$ of the composite positive electrode material. The composite positive electrode material includes a first lithium-rich manganese-based positive electrode material and a second lithium-rich manganese-based positive electrode material. Primary particles of the first lithium-rich manganese-based positive electrode material are rod-like particles, a length of the rod-like particle is 0.1-1.5 μm, and a volume median diameter $D_v50$ of secondary particles of the first lithium-rich manganese-based positive electrode material is 3-8 μm. Primary particles of the second lithium-rich manganese-based positive electrode material are spheroidal particles, a diameter of the spheroidal particle is 0.1-400 nm, and a volume median diameter $D_v50$ of secondary particles of the second lithium-rich manganese-based positive electrode material is 8-20 μm.

In the technical solutions of embodiments of this application, the volume median diameter $D_v50$ of the secondary particles of the first lithium-rich manganese-based positive electrode material is 3-8 μm, and the volume median diameter $D_v50$ of the secondary particles of the second lithium-rich manganese-based positive electrode material is 8-20 μm, so that large and small particles are mixed. In addition, the span is designed. If the span is less than 1.2, it indicates that overall particle sizes of the positive electrode material are uniform, a gap between materials is large, and the compacted density is low. If the span is greater than 2.0, distributions of large and small particle sizes between materials vary greatly, producing micropowder or a material with an ultra-large particle size and leading to poor kinetic performance. Therefore, the span of 1.2-2.0 facilitates gap filling with large and small particles and helps increase the compacted density. Further, shapes and sizes of the primary particles of the first lithium-rich manganese-based positive electrode material and the second lithium-rich manganese-based positive electrode material are limited. The primary particles of the first lithium-rich manganese-based positive electrode material are rod-like particles, the length of the rod-like particle is 0.1-1.5 µm, and a specific surface area is small. This helps prolong the cycle life. The primary particles of the second lithium-rich manganese-based positive electrode material are spheroidal particles, the diameter of the spheroidal particle is 0.1-400 nm, and a specific surface area is large. This achieves good kinetic performance and helps improve capacity utilization. The two materials are mixed to form the composite positive electrode material, so that the cycling performance of a secondary battery is improved. In this way, the volume median diameter $D_v50$ of the secondary particles of the first lithium-rich manganese-based positive electrode material and the volume median diameter $D_v50$ of the secondary particles of the second lithium-rich manganese-based positive electrode material are controlled, the span of the composite positive electrode material is controlled, and the shapes and sizes of the primary particles of the first lithium-rich manganese-based positive electrode material and the second lithium-rich manganese-based positive electrode material are controlled, so that the composite positive electrode material has high compacted density and the secondary battery has good cycling performance.

The composite positive electrode material disclosed in the embodiments of this application may be applied to a secondary battery, and the secondary battery may be used in an electric apparatus that uses a battery as a power source or any energy storage system that uses a battery as an energy storage element. The electric apparatus may be but is not limited to a mobile phone, a tablet computer, a notebook computer, an electric toy, an electric tool, an electric bicycle, an electric vehicle, a ship, a spacecraft, and the like. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For ease of description, an electric apparatus 1000 according to an embodiment of this application is used as an example for description.

FIG. 1 is a schematic structural diagram of an electric apparatus according to some embodiments of this application. The electric apparatus 1000 may be an oil-fueled vehicle, a gas-powered vehicle, or a new energy vehicle. The new energy vehicle may be a battery electric vehicle, a hybrid electric vehicle, an extended-range vehicle, or the like. A battery 100 is disposed in the electric apparatus 1000, and the battery 100 may be disposed at the bottom, front, or rear of the electric apparatus 1000. The battery 100 may be configured to supply power to the electric apparatus 1000. For example, the battery 100 may be used as an operational power source for the electric apparatus 1000. The electric apparatus 1000 may further include a controller 200 and a motor 300. The controller 200 is configured to control the battery 100 to supply power to the motor 300, for example, to satisfy power needs of start, navigation, and driving of the electric apparatus 1000.

In some embodiments of this application, the battery 100 can be used as not only the operational power source for the electric apparatus 1000 but also a driving power source for the electric apparatus 1000, replacing or partially replacing fossil fuel or natural gas to provide driving traction for the electric apparatus 1000.

Figure 2:
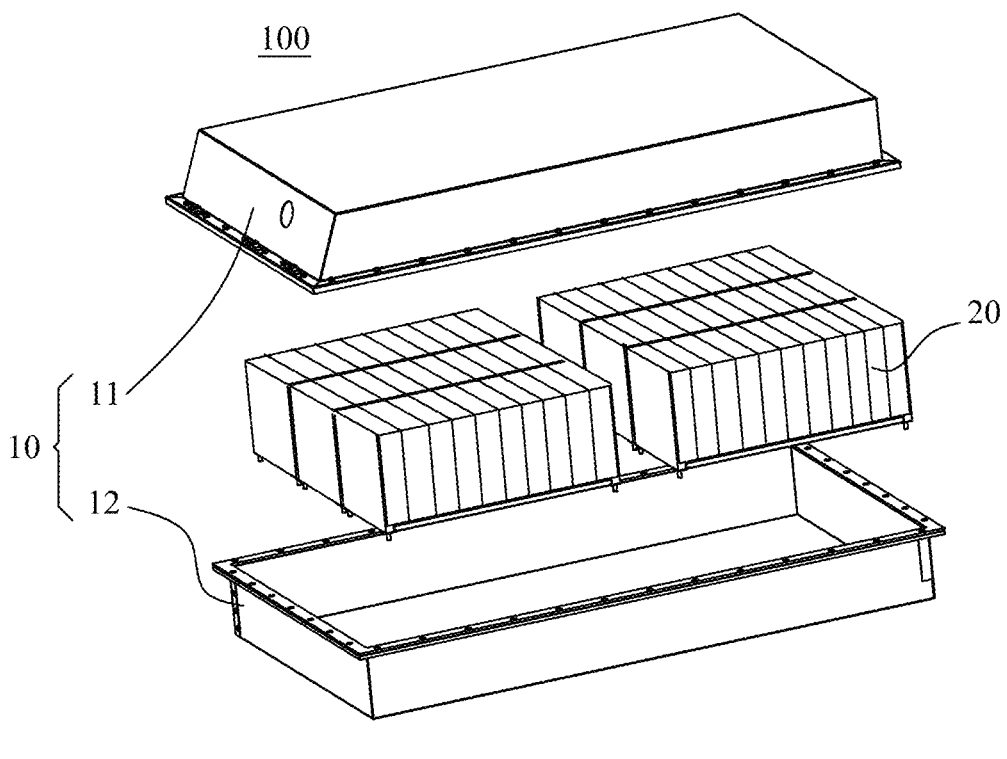
FIG. 2 is a schematic structural exploded view of a battery according to some embodiments of this application.

FIG. 2 is an exploded view of a battery 100 according to some embodiments of this application. The battery 100 includes a box 10 and a battery cell 20, and the battery cell 20 is accommodated in the box 10. The box 10 is configured to provide an accommodating space for the battery cell 20. The box 10 may be in a variety of structures. In some embodiments, the box 10 may include a first portion 11 and a second portion 12. The first portion 11 and the second portion 12 fit together so that the first portion 11 and the second portion 12 jointly define an accommodating space for accommodating the battery cell 20. The second portion 12 may be a hollow structure with an opening at one end, the first portion 11 may be a plate structure, and the first portion 11 is buckled to an opening side of the second portion 12, so that the first portion 11 and the second portion 12 jointly define the accommodating space. Alternatively, the first portion 11 and the second portion 12 each may be a hollow structure with an opening at one side, and the opening side of the first portion 11 is engaged with the opening side of the second portion 12. Certainly, the box 10 formed by the first portion 11 and the second portion 12 may be in a variety of shapes, for example, a cylindrical shape or a cuboid shape.

The battery 100 may include a plurality of battery cells 20. The plurality of battery cells 20 may be connected in series, parallel, or series-parallel, where being connected in series-parallel means a combination of series and parallel connections of the plurality of battery cells 20. The plurality of battery cells 20 may be directly connected in series, parallel, or series-parallel, and then an entirety of the plurality of battery cells 20 is accommodated in the box 10. Certainly, the battery 100 may alternatively be formed by a plurality of battery cells 20 being connected in series, parallel, or series-parallel first to form a battery module, and then a plurality of battery modules being connected in series, parallel, or series-parallel to form an entirety which is accommodated in the box 10. The battery 100 may further include other structures. For example, the battery 100 may further include a busbar configured to implement an electrical connection between the plurality of battery cells 20.

Each battery cell 20 may be a secondary battery or a primary battery, or may be a lithium-sulfur battery, a sodium-ion battery, or a magnesium-ion battery, but is not limited thereto. The battery cell 20 may be cylindrical, flat, cuboid, or in other shapes.

Figure 3:
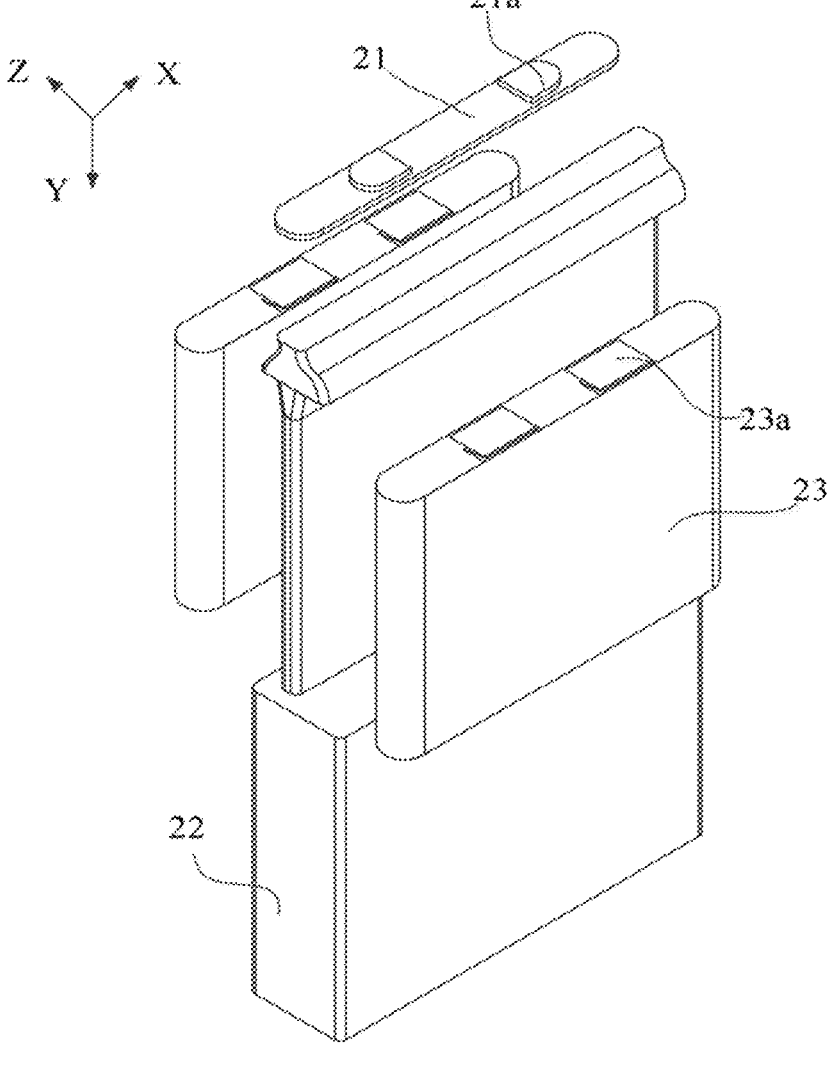
FIG. 3 is a schematic structural exploded view of a battery cell according to some embodiments of this application.

FIG. 3 is a schematic structural exploded view of a battery cell according to some embodiments of this application. The battery cell 20 is a smallest unit constituting a battery. As shown in FIG. 3, the battery cell 20 includes an end cover 21, a housing 22, a cell assembly 23, and other functional components.

The end cover 21 is a component that covers an opening of the housing 22 to isolate an internal environment of the battery cell 20 from an external environment. Without limitation, a shape of the end cover 21 may be adapted to a shape of the housing 22 to fit with the housing 22. The end cover 21 may be made of a material (for example, an aluminum alloy) with specified hardness and strength. In this way, the end cover 21 is not likely to be deformed upon pressure or collision, so that the battery cell 20 can have higher structural strength and improved safety performance. The end cover 21 may be provided with functional components such as an electrode terminal 21a. The electrode terminal 21a may be configured to be electrically connected to the cell assembly 23 for outputting or inputting electric energy of the battery cell 20. In some embodiments, the end cover 21 may be further provided with a pressure relief mechanism for releasing internal pressure when internal pressure or temperature of the battery cell 20 reaches a threshold. The end cover 21 may also be made of a variety of materials, such as copper, iron, aluminum, stainless steel, aluminum alloy, or plastic. This is not particularly limited in the embodiments of this application. In some embodiments, an insulator may be further disposed on an inner side of the end cover 21. The insulator may be configured to isolate an electrically connected component in the housing 22 from the end cover 21 to reduce the risk of short circuit. For example, the insulator may be made of plastic or rubber.

The housing 22 is a component configured to form an internal environment of the battery cell 20 together with the end cover 21. The formed internal environment may be used to accommodate the cell assembly 23, an electrolyte, and other components. The housing 22 and the end cover 21 may be separate components. An opening may be provided on the housing 22, and the end cover 21 covers the opening to form the internal environment of the battery cell 20. Alternatively, the end cover 21 and the housing 22 may alternatively be integrated. Specifically, the end cover 21 and the housing 22 may form a shared connection surface before other components are placed in the housing, and then the end cover 21 covers the housing 22 when the inside of the housing 22 needs to be enclosed. The housing 22 may have a variety of shapes and sizes, such as a cuboid shape, a cylindrical shape, and a hexagonal prism shape. Specifically, a shape of the housing 22 may be determined based on a specific shape and size of the cell assembly 23. The housing 22 may be made of a variety of materials, such as copper, iron, aluminum, stainless steel, aluminum alloy, or plastic. This is not particularly limited in this embodiment of this application.

The cell assembly 23 is a component, in which an electrochemical reaction occurs, of the battery cell 20. The housing 22 may include one or more cell assemblies 23 inside. The cell assembly 23 is mainly formed by winding or stacking a positive electrode plate and a negative electrode plate, and a separator is usually provided between the positive electrode plate and the negative electrode plate. Parts of the positive electrode plate and the negative electrode plate that contain active substances constitute a body portion of the cell assembly, and parts of the positive electrode plate and the negative electrode plate that do not contain active substances each constitute a tab 23a. A positive electrode tab and a negative electrode tab may both be located at one end of the body portion or be located at two ends of the body portion respectively. During charging and discharging of a battery, a positive electrode active substance and a negative electrode active substance react with an electrolyte, and the tab 23a is connected to the electrode terminal to form a current loop.

According to some embodiments of this application, an embodiment of this application provides a composite positive electrode material. A chemical formula of the composite positive electrode material is $Li[Li_xNi_aCo_bMn_cM_d]O_2$, where $x+a+b+c+d=1$, $0<a$, $b$, and $c<1$, $0\leq d\leq0.05$, $0\leq x$, and the element M includes one or more of Al, B, Zr, Sr, Y, Sb, Ta, Na, K, W, Ti, Mg, Nb, Hf, Mo, and Ce. A span of the composite positive electrode material is 1.2-2.0, where the span$=(D_v90-D_v10)/D_v50$, and $D_v90$, $D_v10$, and $D_v50$ are a particle volume distribution $D_v90$, a particle volume distribution $D_v10$, and a volume median diameter $D_v50$ of the composite positive electrode material. The composite positive electrode material includes a first lithium-rich manganese-based positive electrode material and a second lithium-rich manganese-based positive electrode material. Primary particles of the first lithium-rich manganese-based positive electrode material are rod-like particles, a length of the rod-like particle is 0.1-1.5 μm, and a volume median diameter $D_v50$ of secondary particles of the first lithium-rich manganese-based positive electrode material is 3-8 μm. Primary particles of the second lithium-rich manganese-based positive electrode material are spheroidal particles, a diameter of the spheroidal particle is 0.1-400 nm, and a volume median diameter $D_v50$ of secondary particles of the second lithium-rich manganese-based positive electrode material is 8-20 μm.

In some embodiments, the span of the composite positive electrode material may alternatively be 1.2, 1.3, 1.35, 1.38, 1.4, 1.5, 1.55, 1.57, 1.6, 1.62, 1.65, 1.7, 1.75, 1.8, 1.85, 1.86, 1.9, 1.95, 2.0, or the like.

In some embodiments, the span of the composite positive electrode material may alternatively be 1.2-1.5, 1.3-1.6, 1.35-1.65, 1.38-1.7, 1.4-1.85, 1.5-1.9, 1.55-1.95, 1.57-2, 1.6-2, 1.7-2.0, or the like.

In some embodiments, the length of the rod-like particle may alternatively be 0.1 μm, 0.2 μm, 0.3 μm, 0.35 μm, 0.4 μm, 0.42 μm, 0.45 μm, 0.5 μm, 0.55 μm, 0.6 μm, 0.7 μm, 0.75 μm, 0.8 μm, 0.83 μm, 0.85 μm, 0.9 μm, 1.0 μm, 1.05 μm, 1.07 μm, 1.1 μm, 1.2 μm, 1.25 μm, 1.3 μm, 1.35 μm, 1.4 μm, 1.45 μm, 1.48 μm, 1.5 μm, or the like.

In some embodiments, the length of the rod-like particle may alternatively be 0.1-0.2 μm, 0.3-1 μm, 0.35-0.9 μm, 0.4-0.82 μm, 0.3-1.48 μm, 0.35-1.5 μm, 0.4-1.45 μm, 0.5-1.31 μm, 0.55-1.4 μm, 0.6-1.35 μm, 0.7-1.3 μm, 0.83-1.5 μm, or the like.

In some embodiments, the diameter of the spheroidal particle may be 0.1 nm, 0.5 nm, 0.85 nm, 1 nm, 2 nm, 5 nm, 7.5 nm, 10 nm, 12 nm, 22 nm, 25 nm, 28 nm, 30 nm, 44 nm, 52 nm, 60 nm, 70 nm, 82 nm, 90 nm, 95 nm, 100 nm, 120 nm, 132 nm, 140 nm, 160 nm, 180 nm, 200 nm, 220 nm, 232 nm, 240 nm, 245 nm, 260 nm, 270 nm, 285 nm, 290 nm, 292 nm, 300 nm, 320 nm, 325 nm, 350 nm, 365 nm, 372 nm, 385 nm, 390 nm, 400 nm, or the like.

In some embodiments, the diameter of the spheroidal particle may be 0.1-200 nm, 0.1-390 nm, 0.5-350 nm, 0.85-385 nm, 1-100 nm, 2-120 nm, 10-100 nm, 12-300 nm, 30-150 nm, 60-300 nm, 70-200 nm, 90.15-300 nm, 95-250 nm, 140-320 nm, 160-400 nm, 180-300 nm, 200-400 nm, or the like.

In some embodiments, $0.1\leq x\leq0.9$, $0.1\leq a\leq0.5$, $0\leq b\leq0.2$, $0.5\leq c<1$, $0\leq d\leq0.05$, and $x+a+b+c+d=1$, so that the composite positive electrode material has higher compacted density and the secondary battery has better cycling performance.

x may alternatively be 0.1, 0.2, 0.25, 0.3, 0.4, 0.5, 0.55, 0.6, 0.7, 0.78, 0.8, 0.9, or the like, or falls within a range defined by any two of the foregoing values, for example, 0.1-0.2, 0.25-0.4, 0.5-0.78, or 0.8-0.9.

a may alternatively be 0.1, 0.15, 0.2, 0.25, 0.3, 0.38, 0.4, 0.42, 0.5, or the like, or falls within a range defined by any two of the foregoing values, for example, 0.1-0.15, 0.2-0.3, 0.38-0.4, or 0.42-0.5.

b may alternatively be 0, 0.02, 0.03, 0.05, 0.08, 0.1, 0.11, 0.125, 0.13, 0.14, 0.15, 0.16, 0.17, 0.185, 0.19, 0.2, or the like, or falls within a range defined by any two of the foregoing values, for example, 0-0.03, 0.05-0.1, 0.11-0.125, 0.13-0.15, 0.16-0.185, or 0.19-0.2.

c may alternatively be 0.5, 0.6, 0.65, 0.7, 0.8, 0.85, 0.88, 0.9, 0.95, 0.99, 0.9999, or the like, or falls within a range defined by any two of the foregoing values, for example, 0.5-0.6, 0.65-0.7, 0.8-0.88, 0.9-0.95, or 0.99-0.9999.

d may alternatively be 0, 0.001, 0.005, 0.008, 0.01, 0.015, 0.02, 0.028, 0.03, 0.04, 0.045, 0.048, 0.05, or the like, or falls within a range defined by any two of the foregoing values, for example, 0-0.001, 0.005-0.01, 0.015-0.028, 0.03-0.04, or 0.045-0.05.

According to the embodiments of this application, the span=$(D_v90-D_v10)/D_v50$. "$D_v90$" refers to a particle size of the composite positive electrode material where the cumulative distribution by volume reaches 90% as counted from the small particle size side. To be specific, a volume of the composite positive electrode material whose particle size is less than this particle size accounts for 90% of a total volume of the composite positive electrode material. "$D_v10$" refers to a particle size of the composite positive electrode material where the cumulative distribution by volume reaches 10% as counted from the small particle size side. To be specific, a volume of the composite positive electrode material whose particle size is less than this particle size accounts for 10% of a total volume of the composite positive electrode material. "$D_v50$" refers to a particle size of the composite positive electrode material where the cumulative distribution by volume reaches 50% as counted from the small particle size side. To be specific, a volume of the composite positive electrode material whose particle size is less than this particle size accounts for 50% of a total volume of the composite positive electrode material. A particle size of the composite positive electrode material may be measured by a particle size tester.

Primary particle are initial particles obtained through various chemical reactions, and are also referred to as grains. Small primary particles are likely to be combined due to weak interaction, leading to agglomeration of primary particles. To be specific, many small primary particles are agglomerated. Larger agglomerated particles formed in this case are referred to as secondary particles. Particles before aggregation are primary particles, and particles after aggregation are secondary particles.

Secondary particles are obtained by aggregation of primary particles. Small primary particles are likely to be combined due to weak interaction, leading to agglomeration of primary particles. To be specific, many small primary particles are agglomerated. Larger agglomerated particles formed in this case are referred to as secondary particles. Particles before aggregation are primary particles, and particles after aggregation are secondary particles. That the volume median diameter $D_v50$ of the secondary particles of the first lithium-rich manganese-based positive electrode material is 3-8 μm means that a particle size of the secondary particles of the first lithium-rich manganese-based positive electrode material where the cumulative distribution by volume reaches 50% as counted from the small particle size side is 3-8 μm. To be specific, a volume of the secondary particles of the first lithium-rich manganese-based positive electrode material whose particle size is less than this particle size accounts for 50% of a total volume of the secondary particles of the first lithium-rich manganese-based positive electrode material. That the volume median diameter $D_v50$ of the secondary particles of the second lithium-rich manganese-based positive electrode material is 8-20 μm means that a particle size of the secondary particles of the second lithium-rich manganese-based positive electrode material where the cumulative distribution by volume reaches 50% as counted from the small particle size side is 8-20 μm. To be specific, a volume of the secondary particles of the second lithium-rich manganese-based positive electrode material whose particle size is less than this particle size accounts for 50% of a total volume of the secondary particles of the second lithium-rich manganese-based positive electrode material.

The volume median diameter $D_v50$ of the secondary particles of the first lithium-rich manganese-based positive electrode material is 3-8 μm, and the volume median diameter $D_v50$ of the secondary particles of the second lithium-rich manganese-based positive electrode material is 8-20 μm, so that large and small particles are mixed. In addition, the span is designed. If the span is less than 1.2, it indicates that overall particle sizes of the positive electrode material are uniform, a gap between materials is large, and the compacted density is low. If the span is greater than 2.0, distributions of large and small particle sizes between materials vary greatly, producing micropowder or a material with an ultra-large particle size and leading to poor kinetic performance. Therefore, the span of 1.2-2.0 facilitates gap filling with large and small particles and helps increase the compacted density. Further, shapes and sizes of the primary particles of the first lithium-rich manganese-based positive electrode material and the second lithium-rich manganese-based positive electrode material are limited. The primary particles of the first lithium-rich manganese-based positive electrode material are rod-like particles, the length of the rod-like particle is 0.1-1.5 μm, and a specific surface area is small. This helps prolong the cycle life. The primary particles of the second lithium-rich manganese-based positive electrode material are spheroidal particles, the diameter of the spheroidal particle is 0.1-400 nm, and a specific surface area is large. This achieves good kinetic performance and helps improve capacity utilization. The two materials are mixed to form the composite positive electrode material, so that the cycling performance of a secondary battery is improved. In this way, the volume median diameter $D_v50$ of the secondary particles of the first lithium-rich manganese-based positive electrode material and the volume median diameter $D_v50$ of the secondary particles of the second lithium-rich manganese-based positive electrode material are controlled, the span of the composite positive electrode material is controlled, and the shapes and sizes of the primary particles of the first lithium-rich manganese-based positive electrode material and the second lithium-rich manganese-based positive electrode material are controlled, so that the composite positive electrode material has high compacted density and the secondary battery has good cycling performance.

According to some embodiments of this application, the volume median diameter $D_v50$ of the composite positive electrode material is 6-15 μm, and BET of the composite positive electrode material is 1.5-8.5 $m^2/g$.

In some embodiments, the volume median diameter $D_v50$ of the composite positive electrode material may be 6 μm, 6.5 μm, 7 μm, 7.2 μm, 7.5 μm, 8 μm, 9 μm, 10 μm, 10.5 μm, 11 μm, 12 μm, 13 μm, 13.5 μm, 14 μm, 15 μm, or the like.

In some embodiments, the volume median diameter $D_v50$ of the composite positive electrode material may be 6-10 μm, 6-11 μm, 6-12 μm, 6-13 μm, 6.5-14 μm, 7-12 μm, 7.2-12 μm, 7.5-10 μm, 8-14 μm, 9-14 μm, 10-13 μm, or the like.

In some embodiments, the BET of the composite positive electrode material may be 1.5 $m^2/g$, 2 $m^2/g$, 2.5 $m^2/g$, 2.85 $m^2/g$, 3 $m^2/g$, 3.5 $m^2/g$, 4 $m^2/g$, 4.35 $m^2/g$, 4.5 $m^2/g$, 5 $m^2/g$, 6.5 $m^2/g$, 7 $m^2/g$, 7.64 $m^2/g$, 8 $m^2/g$, 8.38 $m^2/g$, 8.5 $m^2/g$, or the like.

In some embodiments, the BET of the composite positive electrode material may be 1.5-8.38 $m^2/g$, 2-8 $m^2/g$, 2.5-7.64 $m^2/g$, 2.85-7 $m^2/g$, 3-6.5 $m^2/g$, 3.5-5 $m^2/g$, 4-8.5 $m^2/g$, 4.35-7.85 $m^2/g$, 4.5-7 $m^2/g$, 5-8 $m^2/g$, or the like.

That the volume median diameter $D_v50$ of the composite positive electrode material is 6-15 μm means that a particle size of the composite positive electrode material where the cumulative distribution by volume reaches 50% as counted from the small particle size side is 6-15 μm. To be specific, a volume of the composite positive electrode material whose particle size is less than this particle size accounts for 50% of a total volume of the composite positive electrode material. The BET of the composite positive electrode material is 1.5-8.5 m²/g. BET refers to a specific surface area, which is a total area of a material per unit mass, in m²/g.

The volume median diameter $D_v50$ and BET of the composite positive electrode material are within appropriate ranges. This facilitates gap filling with large and small particles and helps increase the compacted density. After the secondary battery is formed, particles can form a pore structure convenient for infiltration by an electrolyte while keeping close contact with each other, so that a velocity of a side reaction between the composite positive electrode material and the electrolyte and the kinetic performance of a positive electrode of the battery are at a proper level, and the secondary battery has good cycling performance.

According to some embodiments of this application, the volume median diameter $D_v50$ of the composite positive electrode material is 7-10 μm, and the BET of the composite positive electrode material is 2-7 m²/g.

That the volume median diameter $D_v50$ of the composite positive electrode material is 7-10 μm means that a particle size of the composite positive electrode material where the cumulative distribution by volume reaches 50% as counted from the small particle size side is 7-10 μm. To be specific, a volume of the composite positive electrode material whose particle size is less than this particle size accounts for 50% of a total volume of the composite positive electrode material.

Ranges of the volume median diameter $D_v50$ and BET of the composite positive electrode material are further limited. This further optimizes the cycling performance of the secondary battery while increasing the compacted density of the composite positive electrode material.

According to some embodiments of this application, the span of the composite positive electrode material is 1.4-1.8.

That the span of the composite positive electrode material is 1.4-1.8 means that the span=$(D_v90-D_v10)/D_v50$=1.4-1.8.

A range of the span of the composite positive electrode material is further limited, so that the compacted density of the composite positive electrode material is further optimized.

According to some embodiments of this application, the length of the rod-like particle is 0.3-1.3 μm, and the diameter of the spheroidal particle is 50-350 nm.

The primary particles of the first lithium-rich manganese-based positive electrode material are rod-like particles, the length of the rod-like particle is 0.3-1.3 μm, and a specific surface area is small. Although capacity utilization is limited, this helps achieve longer cycle life. The primary particles of the second lithium-rich manganese-based positive electrode material are spheroidal particles, the diameter of the spheroidal particle is 50-350 nm, and a specific surface area is large. Although cycle life is reduced due to excessive contact with an electrolyte when the second lithium-rich manganese-based positive electrode material is applied to a battery, this facilitates capacity utilization, keeps the kinetic performance at a proper level, and improves the cycling performance of the secondary battery.

According to some embodiments of this application, a mass ratio of the first lithium-rich manganese-based positive electrode material to the second lithium-rich manganese-based positive electrode material is 5:5-1:9.

The mass ratio of the first lithium-rich manganese-based positive electrode material to the second lithium-rich manganese-based positive electrode material is limited, so that filling with large and small particles is appropriate. This helps increase the compacted density and optimizes the cycling performance of the secondary battery.

According to some embodiments of this application, a span of the secondary particle of the first lithium-rich manganese-based positive electrode material is 0.4≤span≤2.2, and a span of the secondary particle of the second lithium-rich manganese-based positive electrode material is 0.4≤span≤2.2.

In some embodiments, the span of the secondary particle of the first lithium-rich manganese-based positive electrode material may be 0.4, 0.5, 0.55, 0.58, 0.6, 0.65, 0.7, 0.8, 0.84, 0.88, 0.9, 0.95, 1.0, 1.15, 1.2, 1.35, 1.4, 1.5, 1.7, 1.8, 1.9, 1.95, 2.0, 2.05, 2.1, 2.2, or the like.

In some embodiments, the span of the secondary particle of the first lithium-rich manganese-based positive electrode material may be 0.3-1.35, 0.4-2.1, 0.5-2.05, 0.55-2.0, 0.6-1.95, 0.65-1.9, 0.7-1.8, 0.84-1.7, 0.88-1.5, 0.9-1.4, 0.95-1.35, 1.0-2.2, 1.15-2.2, 1.2-2.2, or the like.

In some embodiments, the span of the secondary particle of the second lithium-rich manganese-based positive electrode material may be 0.4, 0.45, 0.5, 0.58, 0.6, 0.68, 0.75, 0.8, 0.85, 0.88, 0.9, 0.95, 1.0, 1.15, 1.2, 1.25, 1.45, 1.5, 1.7, 1.8, 1.9, 1.98, 2.0, 2.15, 2.2, or the like.

In some embodiments, the span of the secondary particle of the second lithium-rich manganese-based positive electrode material may be 0.4-2.15, 0.45-2.1, 0.5-1.5, 0.5-2.0, 0.58-1.98, 0.6-1.9, 0.75-1.8, 0.85-1.7, 0.9-1.5, 1.0-1.8, 1.15-1.9, 1.2-2.05, 1.25-2.1, 1.45-2.2, 1.5-2.2, or the like.

If the span is less than 0.4, it indicates that overall particle sizes are uniform, a gap between materials is large, and the compacted density is low. If the span is greater than 2.2, distributions of large and small particle sizes vary greatly, producing micropowder or a material with an ultra-large particle size and leading to poor kinetic performance. Therefore, the span is 0.4-2.2, and small particles are distributed between large particles, so that a gap filling capability is stronger. This increases the compacted density and helps achieve good kinetic performance.

According to some embodiments of this application, a span of the secondary particle of the first lithium-rich manganese-based positive electrode material is 0.4≤span≤1.5, and a span of the secondary particle of the second lithium-rich manganese-based positive electrode material is 0.4≤span≤1.5.

The span of the secondary particle of the first lithium-rich manganese-based positive electrode material and the span of the secondary particle of the second lithium-rich manganese-based positive electrode material are further optimized to increase the compacted density.

According to some embodiments of this application, BET of the first lithium-rich manganese-based positive electrode material is 0.4-2.5 m²/g, and BET of the second lithium-rich manganese-based positive electrode material is 2.5-10 m²/g.

In some embodiments, the BET of the first lithium-rich manganese-based positive electrode material may be 0.4 m²/g, 0.5 m²/g, 0.6 m²/g, 0.65 m²/g, 0.7 m²/g, 0.8 m²/g, 0.9 m²/g, 1.0 m²/g, 1.14 m²/g, 1.15 m²/g, 1.2 m²/g, 1.3 m²/g, 1.4 m²/g, 1.5 m²/g, 1.54 m²/g, 1.6 m²/g, 1.7 m²/g, 1.8 m²/g, 1.9 m²/g, 2.0 m²/g, 2.1 m²/g, 2.15 m²/g, 2.2 m²/g, 2.35 m²/g, 2.4 m²/g, 2.5 m²/g, or the like.

In some embodiments, the BET of the first lithium-rich manganese-based positive electrode material may be 0.4-2.4 $m^2/g$, 0.5-2.35 $m^2/g$, 0.6-2.2 $m^2/g$, 0.65-2.15 $m^2/g$, 0.7-2.1 $m^2/g$, 0.8-2.0 $m^2/g$, 0.9-1.9 $m^2/g$, 1.0-1.8 $m^2/g$, 1.0-2 $m^2/g$, 1.14-2.5 $m^2/g$, 1.15-2.41 $m^2/g$, 1.2-2.35 $m^2/g$, 1.3-2.3 $m^2/g$, 1.4-2.5 $m^2/g$, 1.5-2.5 $m^2/g$, 1.54-2.5 $m^2/g$, 1.6-2.5 $m^2/g$, 1.7-2.5 $m^2/g$, or the like.

In some embodiments, the BET of the second lithium-rich manganese-based positive electrode material may be 2.5 $m^2/g$, 2.6 $m^2/g$, 2.65 $m^2/g$, 2.9 $m^2/g$, 3.0 $m^2/g$, 3.4 $m^2/g$, 4.0 $m^2/g$, 4.2 $m^2/g$, 4.8 $m^2/g$, 5.9 $m^2/g$, 5.0 $m^2/g$, 6.0 $m^2/g$, 7.0 $m^2/g$, 7.2 $m^2/g$, 8.0 $m^2/g$, 8.45 $m^2/g$, 9.0 $m^2/g$, 9.5 $m^2/g$, 9.85 $m^2/g$, 10 $m^2/g$, or the like.

In some embodiments, the BET of the second lithium-rich manganese-based positive electrode material may be 2.5-9.85 $m^2/g$, 2.6-9.5 $m^2/g$, 2.65-9.0 $m^2/g$, 2.9-8.45 $m^2/g$, 3.0-7.0 $m^2/g$, 3.0-8.0 $m^2/g$, 3.4-8 $m^2/g$, 4.0-8 $m^2/g$, 4.2-8.05 $m^2/g$, 4.8-7.2 $m^2/g$, 5.9-9 $m^2/g$, 5.0-9.3 $m^2/g$, 6.0-9.65 $m^2/g$, 7.0-10 $m^2/g$, or the like.

The specific surface area of the first lithium-rich manganese-based positive electrode material is small, thereby helping prolong the cycle life. The specific surface area of the second lithium-rich manganese-based positive electrode material is large. A velocity of a side reaction between the second lithium-rich manganese-based positive electrode material and an electrolyte and the kinetic performance of a positive electrode of the battery are good. This helps improve capacity utilization. Therefore, the two materials are mixed to form the composite positive electrode material, so that the cycling performance of the secondary battery is improved.

According to some embodiments of this application, the BET of the first lithium-rich manganese-based positive electrode material is 1.0-2.0 $m^2/g$, and the BET of the second lithium-rich manganese-based positive electrode material is 3.0-7.0 $m^2/g$.

The specific surface areas are further optimized to further improve the cycling performance of the secondary battery.

According to some embodiments of this application, this application provides a preparation method for a positive electrode material, including: providing a first lithium-rich manganese-based positive electrode material, where a chemical formula of the first lithium-rich manganese-based positive electrode material is $Li[Li_{x1}Ni_{a1}Co_{b1}Mn_{c1}M_{d1}]O_2$, $x1'+a1'+b1'+c1'+d1'=1$, $0<a1'$, $b1'$, and $c1'<1$, $0\leq d1'\leq0.05$, $0\leq x1'$, primary particles of the first lithium-rich manganese-based positive electrode material are rod-like particles, a length of the rod-like particle is 0.1-1.5 μm, and a volume median diameter $D_v50$ of secondary particles of the first lithium-rich manganese-based positive electrode material is 3-8 μm; providing a second lithium-rich manganese-based positive electrode material, where a chemical formula of the second lithium-rich manganese-based positive electrode material is $Li[Li_{x2'}Ni_{a2'}Co_{b2'}Mn_{c2'}M_{d2'}]O_2$, $x2'+a2'+b2'+c2'+d2'=1$, $0<a2'$, $b2'$, and $c2'<1$, $0\leq d2'\leq0.05$, $0\leq x2'$, primary particles of the second lithium-rich manganese-based positive electrode material are spheroidal particles, a diameter of the spheroidal particle is 0.1-400 nm, and a volume median diameter $D_v50$ of secondary particles of the second lithium-rich manganese-based positive electrode material is 8-20 μm; and mixing the first lithium-rich manganese-based positive electrode material and the second lithium-rich manganese-based positive electrode material to obtain the composite positive electrode material according to any one of the foregoing embodiments, where a mass ratio for mixing the first lithium-rich manganese-based positive electrode material and the second lithium-rich manganese-based positive electrode material is 5:5-1:9, and the element M includes one or more of Al, B, Zr, Sr, Y, Sb, Ta, Na, K, W, Ti, Mg, Nb, Hf, Mo, and Ce.

In some embodiments, the length of the rod-like particle may alternatively be 0.3 μm, 0.35μ, 0.4μ, 0.42μ, 0.45μ, 0.5 μm, 0.55 μm, 0.6 μm, 0.7 μm, 0.75μ, 0.8 μm, 0.83 μm, 0.85 μm, 0.9 μm, 1.0 μm, 1.05 μm, 1.07 μm, 1.1 μm, 1.2 μm, 1.25 μm, 1.3 μm, 1.35 μm, 1.4 μm, 1.45 μm, 1.48 μm, 1.5 μm, or the like.

In some embodiments, the length of the rod-like particle may alternatively be 0.3-1 μm, 0.35-0.9 μm, 0.4-0.82 μm, 0.3-1.48 μm, 0.35-1.5 μm, 0.4-1.45 μm, 0.5-1.31 μm, 0.55-1.4 μm, 0.6-1.35 μm, 0.7-1.3 μm, 0.83-1.5 μm, or the like.

In some embodiments, the diameter of the spheroidal particle may be 0.1 nm, 0.5 nm, 0.85 nm, 1 nm, 2 nm, 5 nm, 7.5 nm, 10 nm, 12 nm, 22 nm, 25 nm, 28 nm, 30 nm, 44 nm, 52 nm, 60 nm, 70 nm, 82 nm, 90 nm, 95 nm, 100 nm, 120 nm, 132 nm, 140 nm, 160 nm, 180 nm, 200 nm, 220 nm, 232 nm, 240 nm, 245 nm, 260 nm, 270 nm, 285 nm, 290 nm, 292 nm, 300 nm, 320 nm, 325 nm, 350 nm, 365 nm, 372 nm, 385 nm, 390 nm, 400 nm, or the like.

In some embodiments, the diameter of the spheroidal particle may be 0.1-200 nm, 0.1-390 nm, 0.5-350 nm, 0.85-385 nm, 1-100 nm, 2-120 nm, 10-100 nm, 12-300 nm, 30-150 nm, 60-300 nm, 70-200 nm, 90.15-300 nm, 95-250 nm, 140-320 nm, 160-400 nm, 180-300 nm, 200-400 nm, or the like.

In some embodiments, the mass ratio for mixing the first lithium-rich manganese-based positive electrode material and the second lithium-rich manganese-based positive electrode material may be 5:5, 5:6, 4:7, 5:9, 3:11, 4:13, 1:3, 1:5, 2:9, 1:6, 1:7, 1:8, 1:9, or the like.

In some embodiments, the mass ratio for mixing the first lithium-rich manganese-based positive electrode material and the second lithium-rich manganese-based positive electrode material may be 5:5-1:8, 5:6-1:7, 4:7-1:6, 5:9-1:5, 3:11-1:4, 4:13-1:9, 1:3-1:8, 1:5-1:7, 2:9-1:6, 1:7-1:9, or the like.

In some embodiments, $0.1\leq x1'\leq0.9$, $0.1\leq a1'\leq0.5$, $0\leq b1'\leq0.2$, $0.5\leq c1'<1$, $0\leq d1'\leq0.05$, and $x1'+a1'+b1'+c1'+d1'=1$, so that the composite positive electrode material has higher compacted density and the secondary battery has better cycling performance.

$x1'$ may alternatively be 0.1, 0.22, 0.25, 0.3, 0.44, 0.5, 0.55, 0.65, 0.7, 0.78, 0.8, 0.9, or the like, or falls within a range defined by any two of the foregoing values, for example, 0.1-0.22, 0.25-0.44, 0.55-0.78, or 0.8-0.9.

$a1'$ may alternatively be 0.1, 0.15, 0.2, 0.25, 0.35, 0.38, 0.4, 0.45, 0.5, or the like, or falls within a range defined by any two of the foregoing values, for example, 0.1-0.15, 0.2-0.35, 0.38-0.4, or 0.45-0.5.

$b1'$ may alternatively be 0, 0.02, 0.05, 0.08, 0.1, 0.11, 0.125, 0.14, 0.15, 0.17, 0.185, 0.19, 0.2, or the like, or falls within a range defined by any two of the foregoing values, for example, 0-0.02, 0.05-0.1, 0.11-0.125, 0.14-0.15, 0.17-0.185, or 0.19-0.2.

$c1'$ may alternatively be 0.5, 0.6, 0.65, 0.77, 0.8, 0.85, 0.88, 0.92, 0.95, 0.99, 0.9999, or the like, or falls within a range defined by any two of the foregoing values, for example, 0.5-0.6, 0.65-0.77, 0.8-0.88, 0.92-0.95, or 0.99-0.9999.

$d1'$ may alternatively be 0, 0.001, 0.003, 0.005, 0.01, 0.015, 0.023, 0.028, 0.03, 0.04, 0.045, 0.048, 0.05, or the like, or falls within a range defined by any two of the foregoing values, for example, 0-0.001, 0.003-0.01, 0.015-0.023, 0.03-0.04, or 0.045-0.05.

In some embodiments, $0.1 \leq x2' \leq 0.9$, $0.1 \leq a2' \leq 0.5$, $0 \leq b2' \leq 0.2$, $0.5 \leq c2' < 1$, $0 \leq d2' \leq 0.05$, and $x2'+a2'+b2'+c2'+d2'=1$, so that the composite positive electrode material has higher compacted density and the secondary battery has better cycling performance.

x2' may alternatively be 0.1, 0.2, 0.25, 0.3, 0.44, 0.5, 0.55, 0.65, 0.75, 0.78, 0.8, 0.9, or the like, or falls within a range defined by any two of the foregoing values, for example, 0.1-0.2, 0.25-0.44, 0.55-0.75, or 0.78-0.9.

a2' may alternatively be 0.1, 0.18, 0.2, 0.25, 0.32, 0.35, 0.4, 0.47, 0.5, or the like, or falls within a range defined by any two of the foregoing values, for example, 0.1-0.18, 0.2-0.35, 0.35-0.4, or 0.47-0.5.

b2' may alternatively be 0, 0.03, 0.05, 0.08, 0.1, 0.118, 0.125, 0.145, 0.15, 0.17, 0.185, 0.195, 0.2, or the like, or falls within a range defined by any two of the foregoing values, for example, 0-0.03, 0.05-0.1, 0.118-0.125, 0.145-0.15, 0.17-0.185, or 0.195-0.2.

c2' may alternatively be 0.5, 0.6, 0.65, 0.7, 0.8, 0.85, 0.88, 0.9, 0.95, 0.99, 0.999, or the like, or falls within a range defined by any two of the foregoing values, for example, 0.5-0.6, 0.65-0.7, 0.85-0.88, 0.9-0.95, or 0.99-0.999.

d2' may alternatively be 0, 0.001, 0.004, 0.005, 0.01, 0.015, 0.024, 0.028, 0.03, 0.042, 0.045, 0.048, 0.05, or the like, or falls within a range defined by any two of the foregoing values, for example, 0-0.001, 0.004-0.01, 0.015-0.028, 0.03-0.042, or 0.045-0.05.

The volume median diameter $D_v50$ of the secondary particles of the first lithium-rich manganese-based positive electrode material is controlled to be 3-8 µm, and the volume median diameter $D_v50$ of the secondary particles of the second lithium-rich manganese-based positive electrode material is controlled to be 8-20 µm, so that large and small particles are mixed. The mass ratio of the first lithium-rich manganese-based positive electrode material to the second lithium-rich manganese-based positive electrode material is controlled, so that the span of the composite positive electrode material can be optimized, to optimize the compacted density and cycling performance of a secondary battery. Shapes and sizes of the primary particles of the first lithium-rich manganese-based positive electrode material and the second lithium-rich manganese-based positive electrode material are limited. The primary particles of the first lithium-rich manganese-based positive electrode material are rod-like particles, a length of the rod-like particle is 0.1-1.5 µm, and a specific surface area is small. This helps prolong the cycle life. The primary particles of the second lithium-rich manganese-based positive electrode material are spheroidal particles, a diameter of the spheroidal particle is 0.1-400 nm, and a specific surface area is large. A velocity of a side reaction between the second lithium-rich manganese-based positive electrode material and an electrolyte and the kinetic performance of a positive electrode of the battery are good. This helps improve capacity utilization, so that the cycling performance of the secondary battery is improved.

According to some embodiments of this application, the step of providing a first lithium-rich manganese-based positive electrode material includes: evenly mixing a first lithium source and a first precursor at a molar ratio of 1.1-1.9, adding a first additive, and performing sintering to obtain the first lithium-rich manganese-based positive electrode material, where the first lithium source includes one or more of lithium carbonate, lithium hydroxide, lithium phosphate, lithium nitrate, and lithium acetate, a chemical formula of the first precursor is $Ni_{a1}Co_{b1}Mn_{c1}(OH)_2$, $0<a1$, b1, and $c1<1$, an amount of the first additive calculated based on total mass of the first lithium source and the first precursor is 0-20,000 ppm, and the first additive is a compound including the element M.

In some embodiments, the molar ratio for mixing the first lithium source and the first precursor may be 1.1, 1.15, 1.2, 1.3, 1.4, 1.45, 1.5, 1.6, 1.7, 1.78, 1.8, 1.85, 1.9, or the like.

In some embodiments, the molar ratio for mixing the first lithium source and the first precursor may be 1.1-1.85, 1.15-1.78, 1.2-1.7, 1.3-1.6, 1.4-1.8, 1.45-1.9, 1.5-1.9, or the like.

In some embodiments, the amount of the first additive calculated based on the total mass of the first lithium source and the first precursor may be 300 ppm, 400 ppm, 450 ppm, 500 ppm, 800 ppm, 1,000 ppm, 2,000 ppm, 8,000 ppm, 10,000 ppm, 12,000 ppm, 15,000 ppm, 20,000 ppm, or the like.

In some embodiments, the amount of the first additive calculated based on the total mass of the first lithium source and the first precursor may be 300-18,000 ppm, 400-17,000 ppm, 450-16,500 ppm, 500-16,000 ppm, 800-15,000 ppm, 1,000-15,000 ppm, 2,000-14,000 ppm, 8,000-18,000 ppm, 10,000-15,000 ppm, 12,000-16,000 ppm, 13,000-18,000 ppm, 15,000-20,000 ppm, or the like.

A material type of the first precursor and a preparation process are limited, so that the first lithium-rich manganese-based positive electrode material in which the primary particles are rod-like particles with a length of 0.1-1.5 µm and the volume median diameter $D_v50$ of the secondary particles is 3-8 µm is prepared.

According to some embodiments of this application, the step of providing a second lithium-rich manganese-based positive electrode material includes: evenly mixing a second lithium source and a second precursor at a molar ratio of 1.1-1.9, adding a second additive, and performing sintering to obtain the second lithium-rich manganese-based positive electrode material, where the second lithium source includes one or more of lithium carbonate, lithium hydroxide, lithium phosphate, lithium nitrate, and lithium acetate, a chemical formula of the second precursor is $Ni_{a2}Co_{b2}Mn_{c2}(CO)_3$, $0<a2$, b2, and $c2<1$, an amount of the second additive calculated based on total mass of the second lithium source and the second precursor is 0-20,000 ppm, and the second additive is a compound including the element M.

In some embodiments, the molar ratio for mixing the second lithium source and the second precursor may be 1.1, 1.25, 1.3, 1.35, 1.4, 1.5, 1.55, 1.6, 1.65, 1.7, 1.8, 1.85, 1.9, or the like.

In some embodiments, the molar ratio for mixing the second lithium source and the second precursor may be 1.1-1.85, 1.15-1.78, 1.2-1.7, 1.3-1.6, 1.4-1.8, 1.45-1.9, 1.5-1.9, or the like.

In some embodiments, the amount of the second additive calculated based on the total mass of the second lithium source and the second precursor may be 300 ppm, 800 ppm, 1,500 ppm, 2,500 ppm, 5,000 ppm, 8,000 ppm, 9,000 ppm, 10,000 ppm, 13,500 ppm, 15,000 ppm, 18,000 ppm, 20,000 ppm, or the like.

In some embodiments, the amount of the second additive calculated based on the total mass of the second lithium source and the second precursor may be 300-18,000 ppm, 400-17,000 ppm, 450-16,500 ppm, 500-16,000 ppm, 800-15,000 ppm, 1,000-15,000 ppm, 2,000-14,000 ppm, 8,000-18,000 ppm, 10,000-15,000 ppm, 12,000-16,000 ppm, 13,000-18,000 ppm, 15,000-20,000 ppm, or the like.

A material type of the second precursor and a preparation process are limited, so that the second lithium-rich manganese-based positive electrode material in which the primary particles are spheroidal particles with a diameter of 0.1-400 nm and the volume median diameter $D_v50$ of the secondary particles is 8-20 μm is prepared.

According to some embodiments of this application, in the steps of preparing the first lithium-rich manganese-based positive electrode material and the second lithium-rich manganese-based positive electrode material, sintering temperature is 700° C.-1000° C., sintering time is 10-40 h, and a sintering atmosphere is an air or inert atmosphere.

In some embodiments, the sintering temperature may be 700° C., 720° C., 750° C., 800° C., 850° C., 900° C., 950° C., 1000° C., or the like.

In some embodiments, the sintering time may be 10 h, 12 h, 15 h, 20 h, 24 h, 30 h, 36 h, 40 h, or the like.

The sintering temperature is temperature at which complex physical and chemical changes are to occur during sintering. The physical and chemical changes may be dehydration of a raw material, oxidative decomposition, melting of a fusible material, formation of a liquid phase, disappearance of an old crystal phase, formation of a new crystal phase, constant changes of an amount of newly formed compounds, and constant changes of a composition, a quantity, and viscosity of liquid phases.

Material types of the precursors and a preparation process are limited. This helps prepare the first lithium-rich manganese-based positive electrode material and the second lithium-rich manganese-based positive electrode material with appropriate shapes and sizes. The material types are defined. The first precursor has a hydroxide matrix. This helps form the first lithium-rich manganese-based positive electrode material in which the primary particles are rod-like particles with a length of 0.1-1.5 μm and the volume median diameter $D_v50$ of the secondary particles is 3-8 μm. The second precursor has a carbonate matrix. This helps form the second lithium-rich manganese-based positive electrode material in which the primary particles are spheroidal particles with a diameter of 0.1-400 nm and the volume median diameter $D_v50$ of the secondary particles is 8-20 μm. The two materials are mixed to improve the cycling performance of the secondary battery while increasing the compacted density of the composite positive electrode material.

According to some embodiments of this application, this application provides a positive electrode plate. The positive electrode plate includes a positive electrode film layer and a substrate. The positive electrode film layer includes the composite positive electrode material according to any one of the foregoing solutions or a composite positive electrode material prepared by using the preparation method for a composite positive electrode material.

The positive electrode plate includes a positive electrode current collector and a positive electrode film layer provided on at least one surface of the positive electrode current collector. The positive electrode film layer includes the composite positive electrode material according to any one of the foregoing solutions.

In an example, the positive electrode current collector has two opposite surfaces in its thickness direction, and the positive electrode film layer is provided on either or both of the two opposite surfaces of the positive electrode current collector.

In some implementations, the positive electrode current collector may be metal foil or a composite current collector. For example, the metal foil may be aluminum foil. The composite current collector may include a polymer material matrix and a metal layer formed on at least one surface of the polymer material matrix. The composite current collector may be formed by applying a metal material (aluminum, aluminum alloy, nickel, nickel alloy, titanium, titanium alloy, silver, silver alloy, or the like) to the polymer material matrix (for example, polypropylene (PP), polyethylene terephthalate (PET), polybutylene terephthalate (PBT), polystyrene (PS), or polyethylene (PE)).

The positive electrode film layer includes the composite positive electrode material or a composite positive electrode material prepared by using the preparation method for a composite positive electrode material, to improve the cycling performance of a secondary battery.

According to some embodiments of this application, the positive electrode film layer further includes a conductive agent and a binder, and the positive electrode film layer includes 95%-99.5% of the composite positive electrode material based on a total weight of the positive electrode film layer.

In some embodiments, based on the total weight of the positive electrode film layer, a mass percentage of the composite positive electrode material in the positive electrode film layer may be 95%, 95.5%, 96%, 97%, 97.5%, 98%, 98.5%, 99%, 99.5%, or the like.

In some implementations, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some implementations, the conductive agent may include at least one of superconducting carbon, acetylene black, carbon black, Ketjen black, carbon dot, carbon nanotube, graphene, and carbon nanofiber.

The percentage of the composite positive electrode material in the positive electrode film layer is adjusted and controlled to further improve the energy density and cycle life of the secondary battery.

According to some embodiments of this application, this application provides a secondary battery including the positive electrode plate according to any one of the foregoing solutions. The secondary battery may be the battery 100 or the battery cell 20 described above.

The secondary battery includes a positive electrode plate, a negative electrode plate, an electrolyte, and a separator. During charging and discharging of the battery, active ions are intercalated and deintercalated back and forth between the positive electrode plate and the negative electrode plate. The electrolyte migrates ions between the positive electrode plate and the negative electrode plate. The separator is disposed between the positive electrode plate and the negative electrode plate, mainly to prevent a short circuit of positive and negative electrodes and to allow ions to pass through.

The secondary battery includes a positive electrode plate that contains a composite positive electrode material, so that the secondary battery has good cycling performance.

According to some embodiments of this application, this application further provides an electric apparatus including the secondary battery according to any one of the foregoing solutions, and the secondary battery is configured to provide electric energy for the electric apparatus.

The electric apparatus may be any one of the foregoing electric devices or systems.

Figure 4:
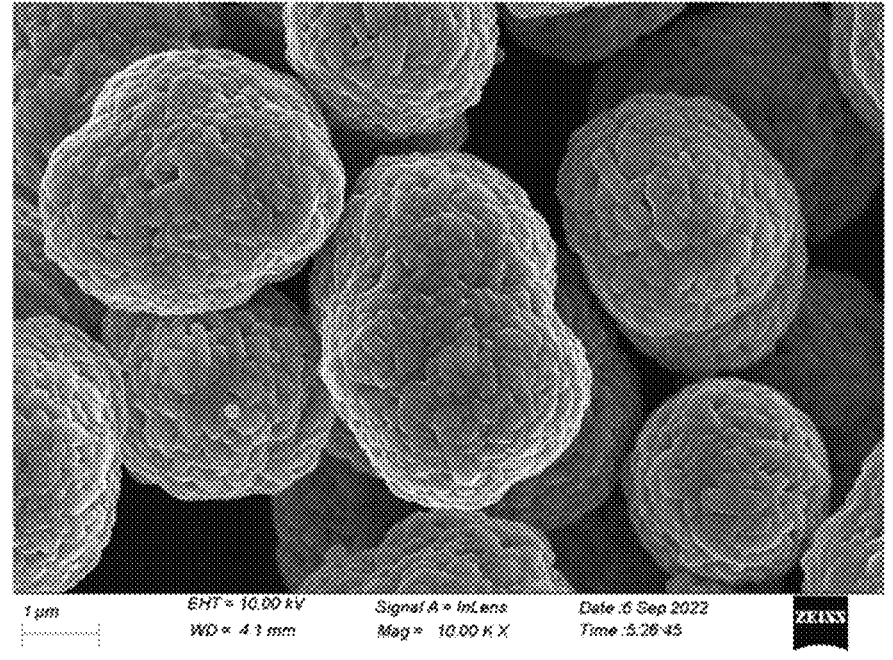
FIG. 4 is a SEM image of a first lithium-rich manganese-based positive electrode material according to some embodiments of this application.

According to an example of this application, a composite positive electrode material is provided. First, a first precursor A0 and a second precursor B0 of two lithium-rich manganese-based positive electrode materials were prepared by using a co-precipitation method. Specific steps are as follows:

S1: A 2 mol/L solution was prepared by using nickel sulfate, cobalt sulfate, and manganese sulfate at a molar ratio of 33:4:63. The solution was put in a reactor, and a sodium hydroxide solution with a molar concentration of 10 mol/L and ammonia with a molar concentration of 5 mol/L were added. In an inert atmosphere, reaction temperature was controlled to be 40° C.-60° C., a pH value was controlled to be within a range of 7.5-8.5, a stirring speed was controlled to be within a range of 600-1,000 rpm, and reaction time was controlled to be 8-12 h. After the reaction ended, the reaction conditions were controlled to be unchanged, and aging was performed for 12-48 h to adjust particle sizes and microscopic shapes, to prepare the first precursor A0 ($Ni_{0.33}Co_{0.04}Mn_{0.63}(OH)_2$), where a particle size of the first precursor A0 was 4.5 μm, and a span was approximately 1.25. Lithium hydroxide and A0 were evenly mixed at a molar ratio of 1.35:1. Then 1,000 ppm $ZrO_2$ additive was added, and all powder was put in a high-speed mixer for mixing at 200 r/min for 2 h. Finally, sintering was performed in an air atmosphere at 950° C. for 20 h to obtain a first lithium-rich manganese-based positive electrode material A, where the first lithium-rich manganese-based positive electrode material A was $Li_{1.15}Ni_{0.28}Co_{0.03}Mn_{0.54}O_2$. A SEM image of the first lithium-rich manganese-based positive electrode material A is shown in FIG. 4.

Figure 5:
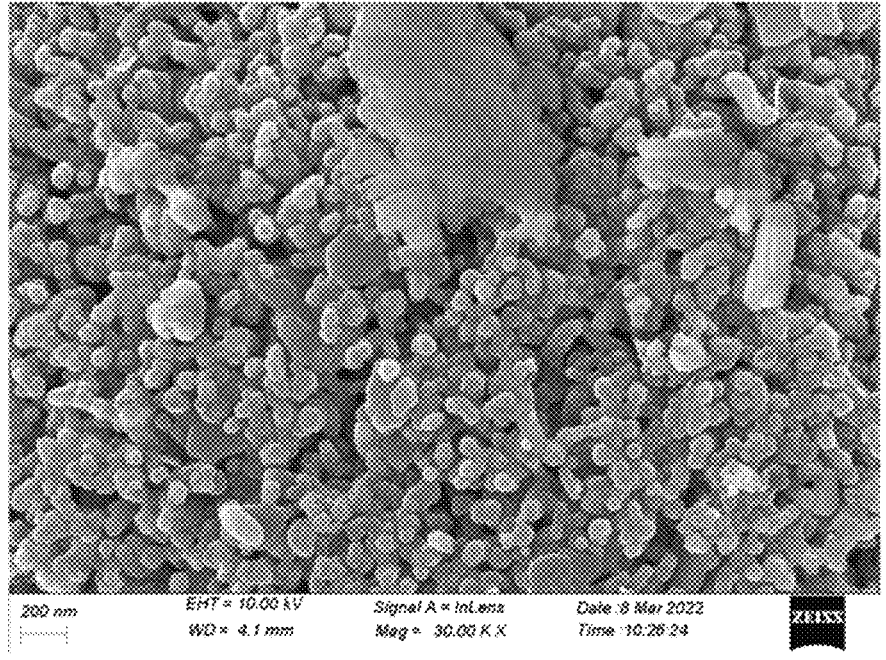
FIG. 5 is a SEM image of a second lithium-rich manganese-based positive electrode material according to some embodiments of this application.

S2: A 2 mol/L solution was prepared by using nickel sulfate, cobalt sulfate, and manganese sulfate at a molar ratio of 29:8:63. The solution was put in a reactor, and a sodium carbonate solution with a molar concentration of 10 mol/L and ammonia with a molar concentration of 5 mol/L were added. In an inert atmosphere, reaction temperature was controlled to be 40° C.-60° C., a pH value was controlled to be within a range of 7.5-8.5, a stirring speed was controlled to be within a range of 600-1,000 rpm, and reaction time was controlled to be 8-12 h. After the reaction ended, the reaction conditions were controlled to be unchanged, and aging was performed for 12-48 h to adjust particle sizes and microscopic shapes, to prepare the second precursor B0 ($Ni_{0.29}Co_{0.08}Mn_{0.63}CO_3$), where a particle size of the second precursor B0 was 9 μm, and a span was approximately 1.5. Lithium carbonate and B0 were evenly mixed at a molar ratio of 1.35:1. Then 1,000 ppm $Al_2O_3$ additive was added, and all powder is put in a high-speed mixer for mixing at 200 r/min for 2 h. Finally, sintering was performed in an air atmosphere at 950° C. for 20 h to obtain a second lithium-rich manganese-based positive electrode material B, where the second lithium-rich manganese-based positive electrode material B was $Li_{1.15}Ni_{0.25}Co_{0.06}Mn_{0.54}O_2$. A SEM image of the second lithium-rich manganese-based positive electrode material B is shown in FIG. 5.

S3: The first lithium-rich manganese-based positive electrode material A and the second lithium-rich manganese-based positive electrode material B were evenly mixed at a mass ratio of 3:7 to obtain a composite positive electrode material.

Figure 6:
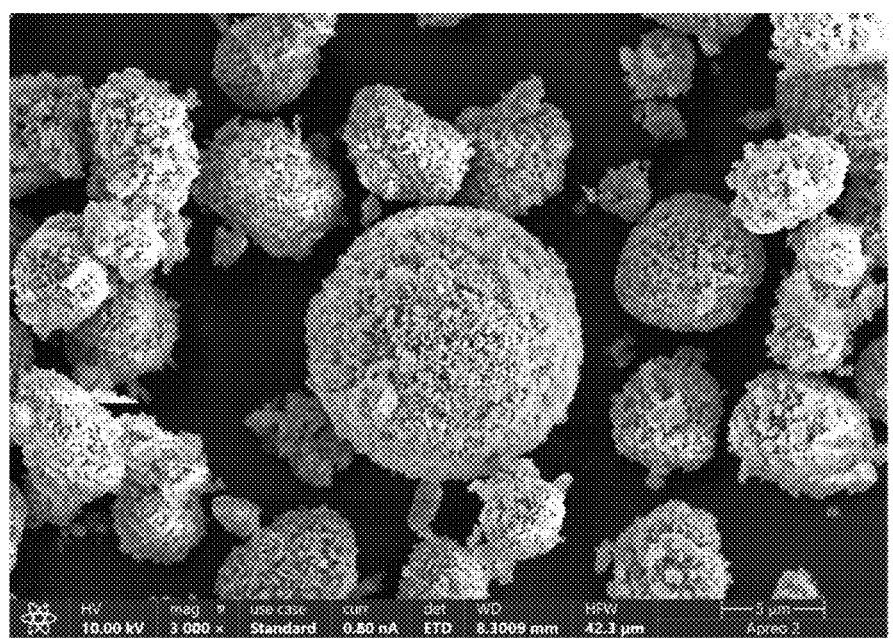
FIG. 6 is a SEM image of a composite positive electrode material according to some embodiments of this application.

A SEM image of the composite positive electrode material is shown in FIG. 6. FIG. 6 is a SEM image of a composite positive electrode material according to some embodiments of this application.

During preparation of a positive electrode plate, cathode powder:PVDF:NMP=96:2:2, and surface density of a cathode plate was 11.5 mg/cm².

According to a comparative example of this application, a positive electrode material is provided. Specific steps are as follows:

A 2 mol/L solution was prepared by using nickel sulfate, cobalt sulfate, and manganese sulfate at a molar ratio of 29:8:63. The solution was put in a reactor, and a sodium carbonate solution with a molar concentration of 10 mol/L and ammonia with a molar concentration of 5 mol/L were added. In an inert atmosphere, reaction temperature was controlled to be 40° C.-60° C., a pH value was controlled to be within a range of 7.5-8.5, a stirring speed was controlled to be within a range of 600-1,000 rpm, and reaction time was controlled to be 8-12 h. After the reaction ended, the reaction conditions were controlled to be unchanged, and aging was performed for 12-48 h to adjust particle sizes and microscopic shapes, to prepare the second precursor B0 ($Ni_{0.29}Co_{0.08}Mn_{0.63}CO_3$), where a particle size of the second precursor B0 was 9 μm, and a span was approximately 1.5. Lithium carbonate and B0 were evenly mixed at a molar ratio of 1.35:1. Then 1,000 ppm $Al_2O_3$ additive was added, and all powder is put in a high-speed mixer for mixing at 200 r/min for 2 h. Finally, sintering was performed in an air atmosphere at 950° C. for 20 h to obtain a second lithium-rich manganese-based positive electrode material B, where the second lithium-rich manganese-based positive electrode material B was $Li_{1.15}Ni_{0.25}Co_{0.06}Mn_{0.54}O_2$. A SEM image of the second lithium-rich manganese-based positive electrode material B is shown in FIG. 5.

During preparation of a lithium-rich manganese-based positive electrode plate, cathode powder:PVDF:NMP=96:2:2, and surface density of a cathode plate was 11.5 mg/cm².

For ease of comparison, the first lithium-rich manganese-based positive electrode material A was denoted as a material A in the table, with a chemical formula of $Li_{1.15}Ni_{0.28}Co_{0.03}Mn_{0.54}O_2$, and the second lithium-rich manganese-based positive electrode material A was denoted as a material B in the table, with a chemical formula of $Li_{1.15}Ni_{0.25}Co_{0.06}Mn_{0.54}O_2$. Preparation methods for a composite positive electrode material in Examples 2 to 5 were similar to a preparation method for a composite positive electrode material in Example 1, with a difference lied in that materials A and materials B with different particle sizes were prepared, and mixing ratios for the materials A and the materials B were different. Only the materials A or the materials B were prepared in comparative examples. Other preparation methods were consistent with a preparation method for a lithium-rich manganese-based positive electrode material in Example 1. Compacted density and related properties of lithium-rich manganese-based positive electrode materials prepared by using the foregoing methods were tested. Detailed results are shown in Table 1.

A method for measuring a capacity retention rate of a full battery at 25° C. was as follows: At 25° C., the battery was charged to 4.55 V at a constant current of 1C, then charged at a constant of 4.55 V until the current dropped to 0.05C, and then discharged to 2.5 V at a constant current of 1C to obtain a specific discharge capacity (Cd1) of the first cycle. Charging and discharging were repeated for 100 cycles in this manner to obtain a specific discharge capacity (denoted as Cdn) of a lithium-ion battery after n cycles. Capacity retention rate=Specific discharge capacity after n cycles/Specific discharge capacity of the first cycle. 1C=250 mAh/g.

TABLE 1

| | D$_v$50 of secondary particles of material A (μm) | D$_v$50 of secondary particles of material B (μm) | A:B Mass ratio | D$_v$50 of composite positive electrode material (μm) | Compacted density of positive electrode plate (g/cm$^3$) | Capacity retention rate after 30 cycles at 25° C. |
|---|---|---|---|---|---|---|
| Example 1 | 7.5 | 13 | 3:7 | 11.2 | 2.89 | 98.71% |
| Example 2 | 4 | 20 | 4:6 | 12.8 | 2.88 | 98.39% |
| Example 3 | 8 | 16 | 5:5 | 11.5 | 2.91 | 98.84% |
| Example 4 | 3 | 8 | 2:8 | 7.5 | 2.95 | 98.79% |
| Example 5 | 5 | 12 | 1:9 | 10.7 | 2.9 | 98.36% |
| Comparative example 1 | / | 10 | / | / | 2.75 | 97.8% |
| Comparative example 2 | 7 | / | / | / | 2.8 | 98.3% |

It can be learned from comparison between the examples and the comparative examples that the composite positive electrode material prepared in the present disclosure has higher compacted density and can improve the cycling performance of a secondary battery.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the foregoing embodiments or make equivalent replacements to some or all technical features thereof without departing from the scope of the technical solutions in the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A composite positive electrode material, wherein:

a span of the composite positive electrode material is 1.2-2.0, wherein the span=(D$_v$90–D$_v$10)/D$_v$50, and D$_v$90, D$_v$10, and D$_v$50 are a particle volume distribution D$_v$90, a particle volume distribution D$_v$10, and a volume median diameter D$_v$50 of the composite positive electrode material; and the composite positive electrode material comprises a first lithium-rich manganese-based positive electrode material and a second lithium-rich manganese-based positive electrode material, wherein:

primary particles of the first lithium-rich manganese-based positive electrode material are rod-like particles, a length of the rod-like particle is 0.1-1.5 μm, and a volume median diameter D$_v$50 of secondary particles of the first lithium-rich manganese-based positive electrode material is 3-8 μm; and primary particles of the second lithium-rich manganese-based positive electrode material are spheroidal particles, a diameter of the spheroidal particle is 0.1-400 nm, and a volume median diameter D$_v$50 of secondary particles of the second lithium-rich manganese-based positive electrode material is 8-20 μm.

2. The composite positive electrode material according to claim 1, wherein the volume median diameter D$_v$50 of the composite positive electrode material is 6-15 μm, and BET of the composite positive electrode material is 1.5-8.5 m$^2$/g.

3. The composite positive electrode material according to claim 1, wherein the volume median diameter D$_v$50 of the composite positive electrode material is 7-10 μm, and BET of the composite positive electrode material is 2-7 m$^2$/g.

4. The composite positive electrode material according to claim 1, wherein the span of the composite positive electrode material is 1.4-1.8.

5. The composite positive electrode material according to claim 1, wherein the length of the rod-like particle is 0.3-1.3 μm, and the diameter of the spheroidal particle is 50-350 nm.

6. The composite positive electrode material according to claim 1, wherein a mass ratio of the first lithium-rich manganese-based positive electrode material to the second lithium-rich manganese-based positive electrode material is 5:5-1:9.

7. The composite positive electrode material according to claim 1, wherein a span of the secondary particle of the first lithium-rich manganese-based positive electrode material is 0.4≤span≤2.2, and a span of the secondary particle of the second lithium-rich manganese-based positive electrode material is 0.4≤span≤2.2.

8. The composite positive electrode material according to claim 1, wherein the span of the secondary particle of the first lithium-rich manganese-based positive electrode material is 0.4≤span≤1.5, and the span of the secondary particle of the second lithium-rich manganese-based positive electrode material is 0.5≤span≤1.5.

9. The composite positive electrode material according to claim 1, wherein BET of the first lithium-rich manganese-based positive electrode material is 0.4-2.5 m$^2$/g, and BET of the second lithium-rich manganese-based positive electrode material is 2.5-10 m$^2$/g.

10. The composite positive electrode material according to claim 1, wherein BET of the first lithium-rich manganese-based positive electrode material is 1.0-2.0 m$^2$/g, and BET of the second lithium-rich manganese-based positive electrode material is 3.0-7.0 m$^2$/g.

11. A preparation method for the composite positive electrode material according to claim 1, comprising:

providing the first lithium-rich manganese-based positive electrode material, wherein primary particles of the first lithium-rich manganese-based positive electrode material are rod-like particles, a length of the rod-like particle is 0.1-1.5 μm, and a volume median diameter $D_v50$ of secondary particles of the first lithium-rich manganese-based positive electrode material is 3-8 μm;

providing a second lithium-rich manganese-based positive electrode material, wherein primary particles of the second lithium-rich manganese-based positive electrode material are spheroidal particles, a diameter of the spheroidal particle is 0.1-400 nm, and a volume median diameter $D_v50$ of secondary particles of the second lithium-rich manganese-based positive electrode material is 8-20 μm; and mixing the first lithium-rich manganese-based positive electrode material and the second lithium-rich manganese-based positive electrode material to obtain the composite positive electrode material, wherein a mass ratio for mixing the first lithium-rich manganese-based positive electrode material and the second lithium-rich manganese-based positive electrode material is 5:5-1:9, the first lithium-rich manganese-based positive electrode material and/or the second lithium-rich manganese-based positive electrode material comprises element M, and the element M comprises one or more of Al, B, Zr, Sr, Y, Sb, Ta, Na, K, W, Ti, Mg, Nb, Hf, Mo, and Ce.

12. The preparation method according to claim 11, wherein providing the first lithium-rich manganese-based positive electrode material comprises:

evenly mixing a first lithium source and a first precursor at a molar ratio of 1.1-1.9, adding a first additive, and performing sintering to obtain the first lithium-rich manganese-based positive electrode material, wherein the first lithium source comprises one or more of lithium carbonate, lithium hydroxide, lithium phosphate, lithium nitrate, and lithium acetate, a chemical formula of the first precursor is $Ni_{a1}CO_{b1}Mn_{c1}(OH)_2$, $0<a1$, b1, and $c1<1$, an amount of the first additive calculated based on total mass of the first lithium source and the first precursor is 0-20,000 ppm, and the first additive is a compound comprising the element M.

13. The preparation method according to claim 11, wherein providing the second lithium-rich manganese-based positive electrode material comprises:

evenly mixing a second lithium source and a second precursor at a molar ratio of 1.1-1.9, adding a second additive, and performing sintering to obtain the second lithium-rich manganese-based positive electrode material, wherein the second lithium source comprises one or more of lithium carbonate, lithium hydroxide, lithium phosphate, lithium nitrate, and lithium acetate, a chemical formula of the second precursor is $Ni_{a2}CO_{b2}Mn_{c2}(CO)_3$, $0<a2$, b2, and $c2<1$, an amount of the second additive calculated based on total mass of the second lithium source and the second precursor is 0-20,000 ppm, and the second additive is a compound comprising the element M.

14. A positive electrode plate, comprising:

a positive electrode film layer, comprising the composite positive electrode material according to claim 1; and a substrate.

15. The positive electrode plate according to claim 14, wherein the positive electrode film layer further comprises a conductive agent and a binder, wherein the positive electrode film layer comprises 95%-99.5% of the composite positive electrode material based on a total weight of the positive electrode film layer.

16. A secondary battery, comprising the positive electrode plate according to claim 14.

17. An electric apparatus, comprising the secondary battery according to claim 16.

* * * * *